(12) United States Patent
Sennersten et al.

(10) Patent No.: US 11,265,401 B2
(45) Date of Patent: Mar. 1, 2022

(54) SPATIAL DATA PROCESSING SYSTEM AND METHOD

(71) Applicant: CMTE DEVELOPMENT LIMITED, Pinjarra Hills (AU)

(72) Inventors: Charlotte Sennersten, Pullenvale (AU); Craig A. Lindley, Pullenvale (AU); Ben Evans, Pullenvale (AU); Alex Grace, Carnegie (AU); Julian Wise, Pinjarra Hills (AU)

(73) Assignee: CMTE DEVELOPMENT LIMITED, Pinjarra Hills (AU)

( * ) Notice: Subject to any disclaimer, the term of this patent is extended or adjusted under 35 U.S.C. 154(b) by 0 days.

(21) Appl. No.: 16/645,419

(22) PCT Filed: Sep. 7, 2018

(86) PCT No.: PCT/AU2018/050969
§ 371 (c)(1),
(2) Date: Mar. 6, 2020

(87) PCT Pub. No.: WO2019/046899
PCT Pub. Date: Mar. 14, 2019

(65) Prior Publication Data
US 2020/0213426 A1   Jul. 2, 2020

(30) Foreign Application Priority Data
Sep. 7, 2017   (AU) ................................ 2017903626

(51) Int. Cl.
*H04L 29/06*   (2006.01)
*G06T 17/05*   (2011.01)
*H04L 69/00*   (2022.01)

(52) U.S. Cl.
CPC .............. *H04L 69/26* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 8,190,585 B2 | 5/2012 | Salemann | |
| 9,488,492 B2 | 11/2016 | Samarasekera et al. | |
| 10,114,969 B1* | 10/2018 | Chaney | ................. H04L 9/3247 |
| 2004/0125103 A1 | 7/2004 | Kaufman et al. | |
| 2005/0151734 A1* | 7/2005 | Gubkin | ................... G06T 9/001 |
| | | | 345/424 |

(Continued)

OTHER PUBLICATIONS

International Search Report and Written Opinion for PCT/AU2018/050969, dated Nov. 1, 2018.

*Primary Examiner* — Frank S Chen
(74) *Attorney, Agent, or Firm* — Marshall, Gerstein & Borun LLP

(57) ABSTRACT

A system for handling 3 dimensional spatial information, the system including: a specialised application layer for the production of visual interactive applications associated with the 3 dimensional spatial information; a generic foundation client layer providing 3 dimensional spatial information interrogation routines, including a message passing interface; and a voxel server for interconnected to said generic foundation client via said message passing interface for the storage of 3 dimensional spatial information as a voxel data base.

23 Claims, 17 Drawing Sheets

(56) References Cited

U.S. PATENT DOCUMENTS

| | | | |
|---|---|---|---|
| 2008/0098450 A1* | 4/2008 | Wu | H04N 21/4821 |
| | | | 725/132 |
| 2010/0198638 A1* | 8/2010 | Deffenbaugh | G01N 23/046 |
| | | | 705/308 |
| 2012/0320363 A1* | 12/2012 | Goodman | G01C 3/08 |
| | | | 356/4.01 |
| 2015/0022521 A1 | 1/2015 | Loop | |
| 2017/0246812 A1* | 8/2017 | Morovic | B29C 64/386 |
| 2018/0032060 A1* | 2/2018 | Zeng | G05B 19/4099 |
| 2018/0174333 A1* | 6/2018 | Feng | A61B 6/037 |
| 2019/0325756 A1* | 10/2019 | Cleaver | G08G 5/0078 |

* cited by examiner

Shape Fitting

SPATIAL DATA PROCESSING SYSTEM AND METHOD

FIELD OF THE INVENTION

The present invention relates to a system and method for the processing of spatialised data, and, in particular, discloses a system for dealing with voxel data structures.

BACKGROUND OF THE INVENTION

Any discussion of the background art throughout the specification should in no way be considered as an admission that such art is widely known or forms part of common general knowledge in the field.

Most software, and models in the form of data, information and knowledge models are too disconnected, and too disconnected to the physical world that they purport to be models of, to address ongoing needs (for example, the web is still based primarily upon a 2D print magazine model). The greatest challenge is the synchronisation of computable models with what they are intended to model, whether in the past, present or future (prediction).

It would be desirable to provide for the efficient storage and processing of geographic, spatial, geometric and material datasets.

SUMMARY OF THE INVENTION

It is an object of the invention, in its preferred form to provide a system and method for the efficient storage and processing of geographic and geometric datasets and for their manipulation.

In accordance with a first aspect of the present invention, there is provided a method for storage, access and updating of geographically based data, the method including the steps of: storing the data indexed by individual x, y and z coordinates, with x, y indicating planar coordinates and z indicating depth coordinates. In some embodiments the invention can include recursively structured geodetic geometric datasets. In some embodiments, the data can be stored as hierarchically voxelised data indexed by quantized x, y, z.

In some embodiments storing the data can be indexed by temporal coordinates. The temporal data can also be included and then indexed and retrieved by temporal coordinates. The embodiments can include a key distinction between location voxels and material voxels. All types of voxels can be recursively/hierarchically structured.

Location voxels may be geodetic or Euclidean. Geodetic voxels are units within a voxelisation of the globe that includes the curvature of the earth in the geometry of the voxels. Euclidean voxels are units within a Euclidean spatial reference frame having 3 orthogonal axes and voxelised into voxels aligned with the Euclidean reference frame; they are not inherently curved. The Euclidean reference frame and/or Euclidean voxels can be geolocated within a geodetic reference frame (i.e., they can be geolocated). E.g. a Euclidean reference frame used to map an underground mine, where this reference frame also has a geodetic location expressed by latitude, longitude and altitude.

In some embodiments, the x, y and z coordinates of location voxels have a default quantisation into approximately 1 m dimensions, although the recursive structure means that these can be recursively composed or decomposed into larger or smaller scale location voxels, respectively. In some embodiments, the default z coordinates range from a height of 20 km to a depth of 10 km.

Material voxels are volume elements spatially quantising volumes of material. Material voxels can be hierarchically composable and decomposable. All material voxels can be located at appropriate hierarchical scales in a system of location voxels. However, a critical difference between location and material voxels is that a location voxel does not change in location, but a material voxel can change in location. Material voxels can also have their material characteristics changed, and/or have a finite life, where they are subsequently transformed, mixed with other material voxels to form a larger scale material voxel, or separated into one or more smaller scale material voxels. So material voxels can be formed and destroyed over time.

In some embodiments, the geographically based data can be stored in a recursively subdividable 3D volumetric manner with geo-referenced spatial location data. The forming material voxels having volume elements spatially quantising volumes of material. The material voxels are preferably hierarchically composable and decomposable. The x, y and z coordinates have a default quantisation representing approximately 1 m distances with scalability. The default z coordinates range from a default height of about 20 km to a depth of about 5 km.

The voxels can include data objects including points, lines, planes, surfaces, polygons, shapes and volumes, as well as structured spatial objects such as textures, images and video.

The voxels can include volume data bounded by a spatial boundary. The voxels can include temporal time series elements and animations. The voxels can also comprise objects having the ability to function as agents and communicate with one another and an external environment.

The voxels can include structures defining a probabilistic distribution of material within a voxel. Origins, structures and surfaces can also be probabilistic. In accordance with a first aspect of the present invention there is provided a system for handling 3 dimensional spatial information the system including: a specialised application layer for the production of visual interactive applications associated with the 3 dimensional spatial information; a generic foundation client providing 3 dimensional spatial information interrogation routines, including a message passing interface; and a voxel server for interconnected to said generic foundation client via said message passing interface for the storage of 3 dimensional spatial information as a voxel data base.

In some embodiments, the voxel database stores 3 dimensional information indexed by individual x, y and z co-ordinates, with x and y being planar co-ordinates and z being depth co-ordinates. In some embodiments the 3 dimensional spatial information is stored recursively, in a hierarchical manner, in a geodetic or Euclidian space.

The 3 dimensional spatial information can include location information, in addition to material properties associated with said location information The 3 dimensional spatial information can includes data objects such as points, lines, planes, surfaces, polygons, shapes or volumes and structed data objects such as textures, images and video.

In some embodiments, the specialised application layer can include a real time object moving in a 3 dimensional spatialised space, recording spatialised data. The 3 dimensional spatial information can include mineral resource value estimates associated with said 3 dimensional spatial location. The mineral resource value estimates can be derived from the merging of multiple models associated with the 3 dimensional spatial information. In some embodiments, the 3 dimensional spatial information includes blockchain verifiable data.

BRIEF DESCRIPTION OF THE DRAWINGS

Embodiments of the invention will now be described, by way of example only, with reference to the accompanying drawings in which.

DETAILED DESCRIPTION

The preferred embodiment provides a multi-dimensional data, information, knowledge and functional hyper-structure grounded in physical space and time, with a reach exceeding the text-based structures and semantics of the internet. The preferred embodiment provides a new infrastructure for this data, knowledge and functional information ecosystem of spatiotemporal entities and their representation, to unify partial solutions into a general computational platform for intellectual, industrial, economic, political, social, and creative theory and practice.

The multidimensional, interconnected information infrastructure is founded upon 3 dimensional (3D) spatial locations, volumes, materials, objects and distributions in time, together with associated properties, behaviours, processes and meta-processes, that may be cognitive, analytical, interpretative, narratological, etc.

The preferred embodiments provide for a system and method which data is stored and manipulated in terms of recursively structured voxels.

Figure 1:
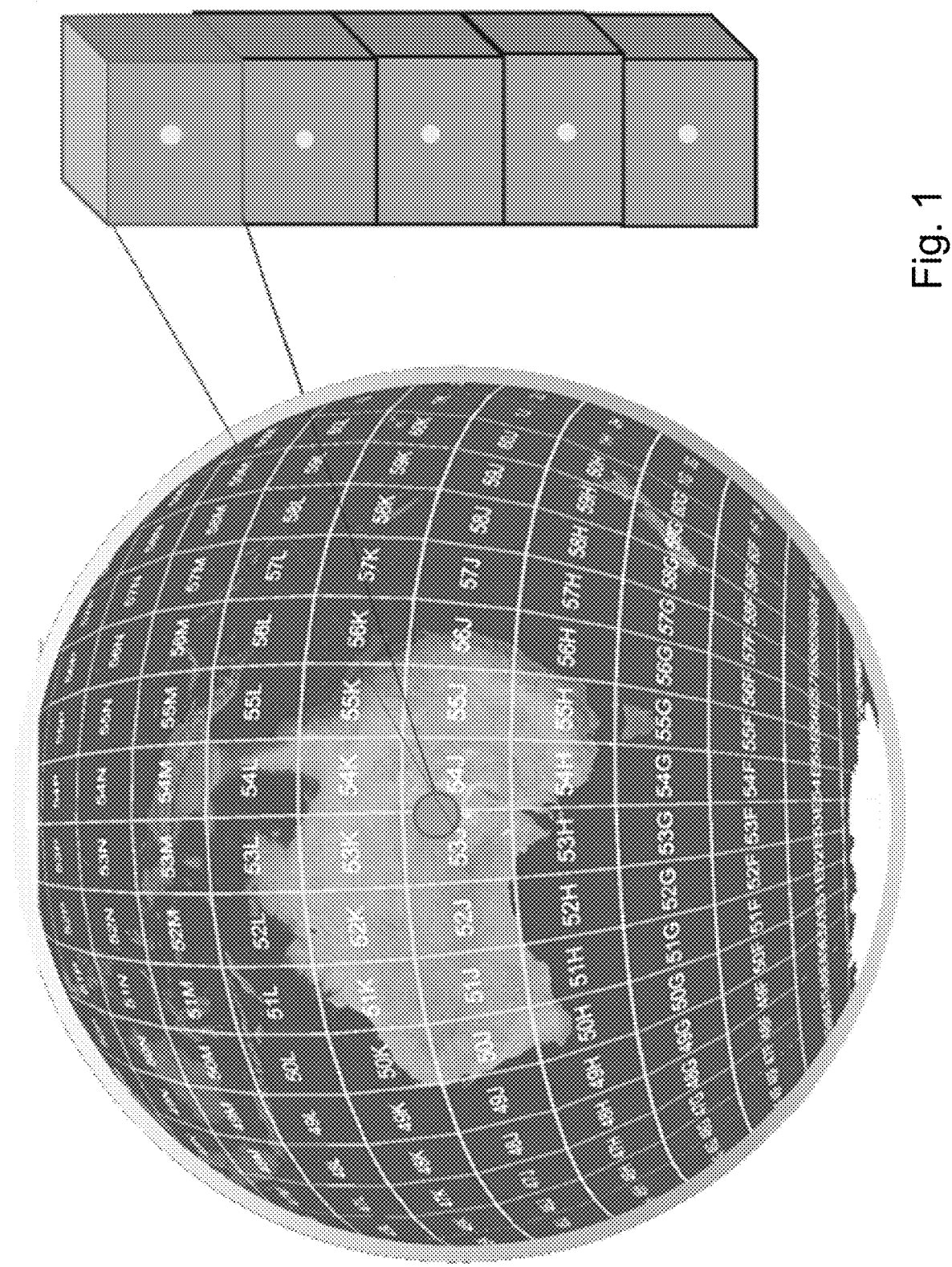
FIG. 1 illustrates the process of VoxelNET dividing the earth into 1 m³ geo-located voxels.

Turning initially to FIG. 1, the digital earth is subdivided into default 1 m2 voxels with individual ID (x, y, z, or and time)/(Latitude, Longitude, Height/Depth and time) centre point addresses. Voxel Protocols (VPs) allow communication 'with' a voxel or among voxels (identified by addresses). The z dimension is further defined in 1 m intervals to a predetermined height and depth. The architecture structure includes recursive geodetic and geometric structures that can be indexed by voxel specific Earth IDs.

Figure 2:
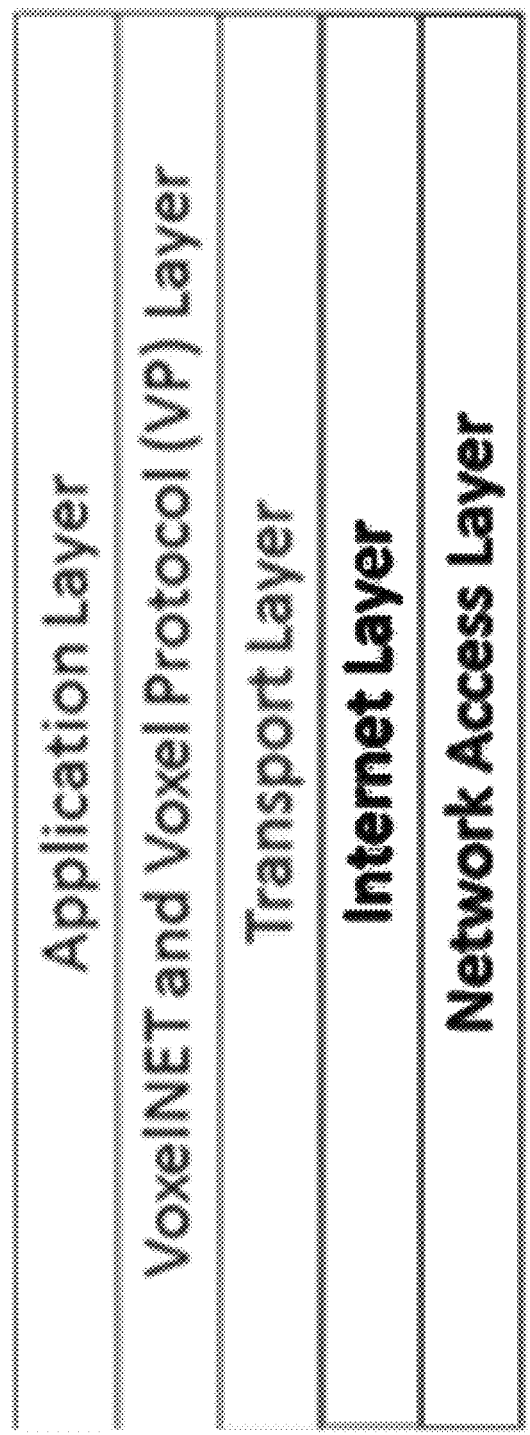
FIG. 2 illustrates the interrelationship of the VoxelNET protocol layer for voxel communication within a typical internet protocol stack.

As illustrated in FIG. 2, the VoxelNET and its associated protocols constitute a layer above the Network Access, Internet and Transport layers of the Internet (TCP/IP) protocol layers (as will be described in more detail hereinafter). This allows for levels of abstraction between applications and underlying infrastructure.

Figure 3:
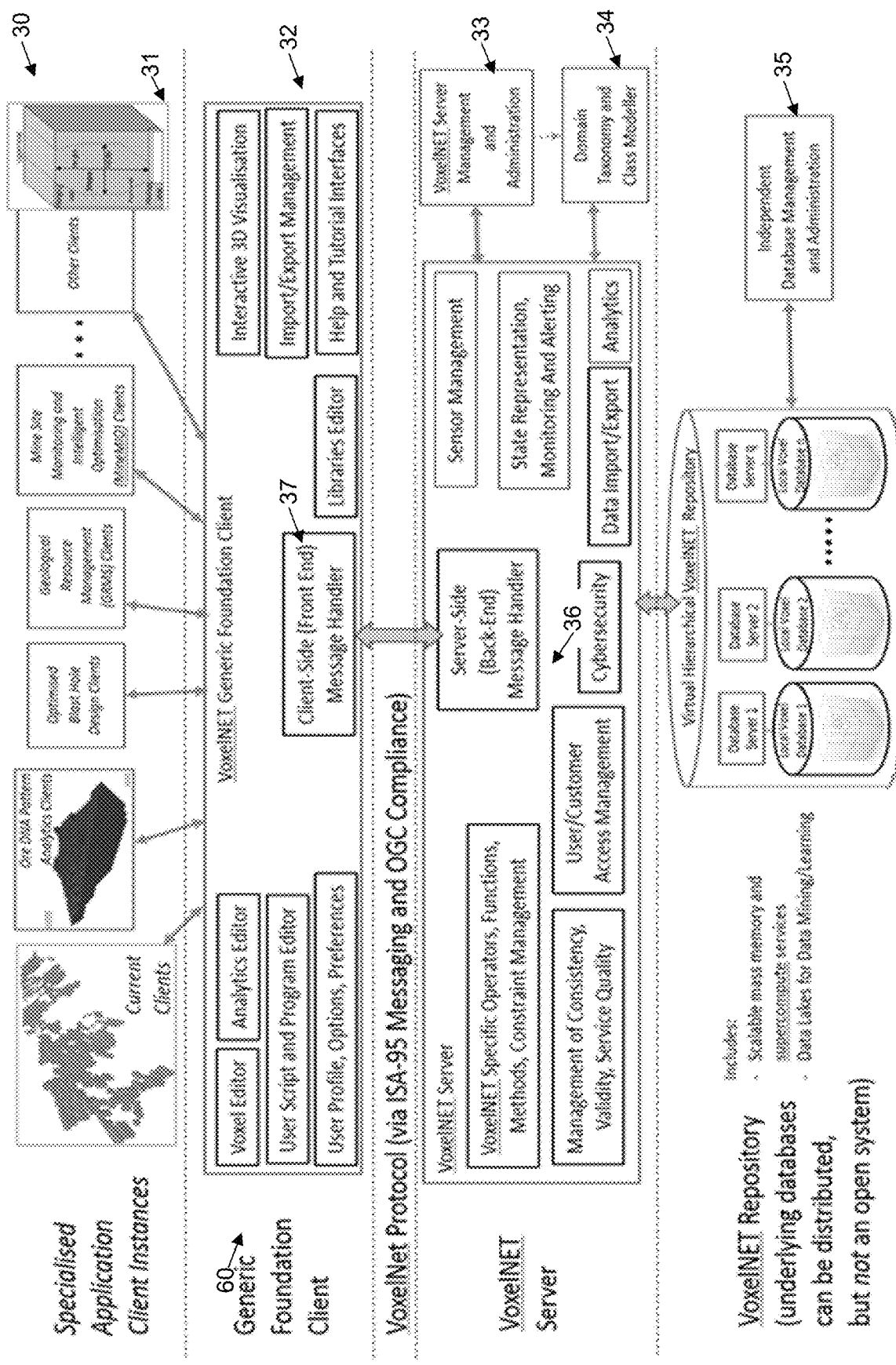
FIG. 3 illustrates the overall structure of the VoxelNET system when built upon a single repository.

A functional overview of a VoxelNET multi-client, single repository (MCSR) system is shown 30 in FIG. 3. The user can access the VoxelNET system via specialised applications 31. The applications call a VoxelNET generic foundation client layer 32 for access to the VoxelNET network. The VoxelNET generic foundation client layer 32 accesses a VoxelNET server 34 via a VoxelNET protocol layer 33. The server, in turn, accesses various VoxelNET repositories 35 which store VoxelNET data in a scalable data store.

VoxelNET-MCSR Repository/Database 35

The VoxelNET Core Conceptual and Logical Structure is expressed in a VoxelNET Repository Schema and Database Design for storage in the VoxelNet. The Representation of Space, Spatial Objects, Geometry and Time can be via a number of core foundations, including:

Location voxels: that are composable and decomposable volume elements in specific geolocations, constituting a recursively subdividable 3D volumetric and geo-referenced spatial location system.

Material voxels, that are composable and decomposable volume elements that spatially quantise volumes of material, and that can be moved and/or modified to reflect movements/modifications of the materials that they represent.

Spatially located objects such as: points, lines (straight or curved), planes (flat or curved), 3D objects (simple Euclidean primitives and complex structures), volumes bounded by any required spatial boundary.

Additionally, the structure includes spatial assemblies of any of these forms, spatial distributions of any of these forms; spatial distributions or assemblies of combinations of these forms, spatial distributions/assemblies of spatial distributions/assemblies (recursively) of any of these forms. All things that change over time have time-stamped changes, recording the history of those objects and supporting time-series analyses.

In OGC terms, geometrical structures representing real world objects are called features. Simple Feature Geometry in VoxelNET is decribed in conformance with OpenGIS® Simple Features Access (SFA) (also called ISO 19125), (OpenGIS® Implementation Standard for Geographic information-Simple feature access-Part 1: Common architecture, and Part 2: SQL option, (OGC 06-103r4, Version: 1.2.1).

Figure 4:
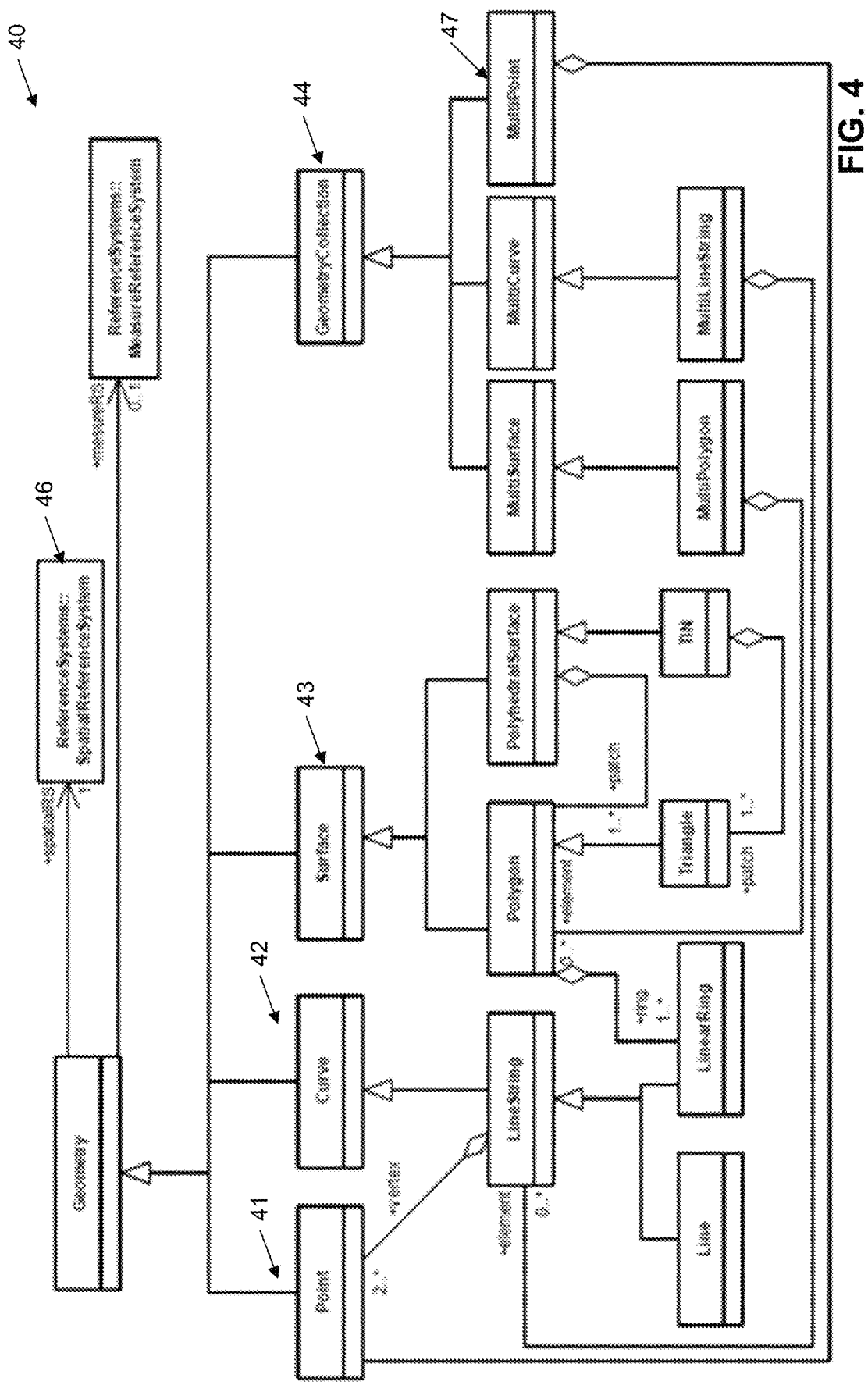
FIG. 4 illustrates the Open Geospatial Consortium geometry class hierarchy for the open geometry class used and extended by the VoxelNET.

FIG. 4 shows the geometry class hierarchy 40 from OGC: 06-103r4 Part 1. The base Geometry class has subclasses for Point, Curve, Surface 41-43 and GeometryCollection 44. Each geometric object is associated with a Spatial Reference System 46 inherited from the Spatial Reference System associated with the base Geometry class.

The extended Geometry model has specialized 0, 1 and 2-dimensional collection classes named MultiPoint, MultiLineString and MultiPolygon 47 for modeling geometries corresponding to collections of Points, LineStrings and Polygons, respectively. MultiCurve and MultiSurface are introduced as abstract superclasses that generalize the collection interfaces to handle Curves and Surfaces.

From OGC: 06-103r4 Part 1, subsection 6.1.2.1: The instantiable subclasses of Geometry defined in this Standard are restricted to 0, 1 and 2-dimensional geometric objects that exist in 2, 3 or 4-dimensional coordinate space ($\Re 2$, $\Re 3$ or $\Re 4$) ($\Re$=dimensionality). Geometry values in $\Re 2$ have points with coordinate values for x and y. Geometry values in $\Re 3$ have points with coordinate values for x, y and z or for x, y and m. Geometry values in $\Re 4$ have points with coordinate values for x, y, z and m. The interpretation of the coordinates is subject to the coordinate reference systems associated to the point. All coordinates within a geometry object should be in the same coordinate reference systems. Each coordinate shall be unambiguously associated to a coordinate reference system either directly or through its containing geometry.

Figure 5:
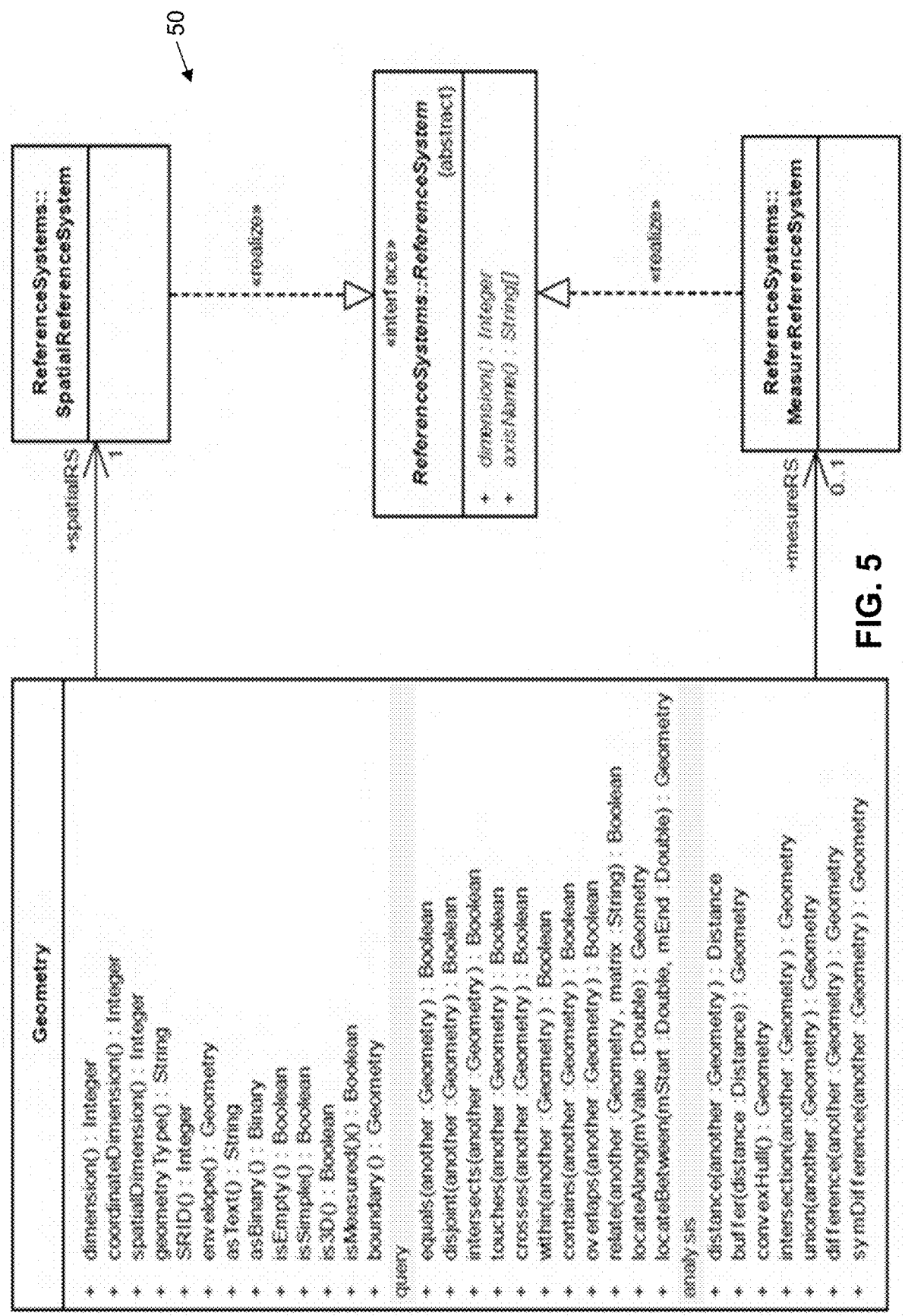
FIG. 5 illustrates example and extended class operations on the geometry object type, which are greatly extended by the VoxelNET.

Example class operations for the Geometry object type are shown 50 in FIG. 5. The z coordinate of a point typically, but not necessarily, represents altitude or elevation. The m coordinate represents a measurement. All Geometry classes described can be defined so that instances of Geometry are topologically closed, i.e. all represented geometries include their boundary as point sets. This does not affect their representation, and open version of the same classes may be used in other circumstances, such as topological representations. A Point value may include an m coordinate value. The m coordinate value allows the application environment to associate some measure with the point values.

Examples of draft table creation statements for some of these forms can be as follows:

```
CREATE TABLE spatialObject (
spatialObject_pk SERIAL primary key,
SRSI smallint,
originPointLatLongHeight GEOGRAPHY(POINTZ,4326) ,
originPointXYZ GEOMETRY(POINTZ,4326),
objectType TEXT,
objectName TEXT,
authourOwner TEXT,
notes TEXT
) ;
CREATE TABLE pointDataSet(
pointDataSet_pk SERIAL primary key,
pointDataSetName VARCHAR(20) NOT NULL,
dateOfCollection DATE
) INHERITS (spatialObject);
CREATE TABLE pointData(
pointData_pk SERIAL primary key,
pointDataSet_fk SERIAL references pointDataSet(pointDataSet_pk),
dataLabel VARCHAR(20) NOT NULL,
dataValue VARCHAR(20),
pointXYZ GEOMETRY(POINTZ,4326)
) INHERITS (spatialObject);
CREATE TABLE_3DPrimitive
(
_3DPrimitive_pk SERIAL primary key,
_3DPolygon GEOMETRY(POLYGONZ,4326)
) INHERITS (spatialObject);
```

The table below compares classes defined in OGC: 06-103r4 Part 1 with the spatial object types defined in this section of the VoxelNET system.

| VoxelNET Construct | OGC: 06-103r4 Part 1 Construct | Comments |
| --- | --- | --- |
| Location Voxel | Not represented | Location Voxels are a logical construct based upon the location of a centre point in a spatial coordinate reference system |
| Material Voxel | Polygon, MultiPolygon, GeometryCollection with Point and volumetric subclasses | Voxelnet adds model extensions to represent probabilistic locations and boundaries, as well as material properties |
| Points | Point, Multipoint | Voxelnet addsmodel extensions to represent probabilistic locations |
| Lines | Line, Simple LineString, LinearRing, Curve, MultiCurve, MultiLineString | Voxelnet addsmodel extensions to represent probabilistic locations |
| Planes | Surface and all subclasses | Voxelnet addsmodel extensions to represent probabilistic locations |
| 3D Objects | Polygon, MultiPolygon | Voxelnet adds model extensions to represent probabilistic locations, as well as material properties and physical relationships among object parts, and potentially cognitive processes if the objects are agents |
| Volumes | Polygon, MultiPolygon | Voxelnet addsmodel extensions to represent probabilistic locations and boundaries. Note: a collision volume or collision mesh is a specific type of volume representing the collidable boundary of an object. |
| Spatial Assemblies | Geometry Collection and all subclasses | Voxelnet adds model extensions to represent connectivity between geometrical objects, and to represent probabilistic locations and boundaries, as well as material properties and physical relationships among object parts, and potentially cognitive processes if the objects are |

| VoxelNET Construct | OGC: 06-103r4 Part 1 Construct | Comments |
|---|---|---|
| | | agents |
| Spatial Distributions | Geometry Collection and all subclasses | Voxelnet adds model extensions to represent probabilistic locations and boundaries. |
| Spatial Distributions or Assemblies of Combinations of Spatial forms | Geometry Collection and all subclasses | Voxelnet addsmodel extensions to represent probabilistic locations and boundaries, as well as material properties and physical relationships among object parts |
| Spatial Distributions/Assemblies of Spatial Distributions/Assemblies (recursively) of Spatial forms | Geometry Collection and all subclasses | Voxelnet addsmodel extensions to represent probabilistic locations and boundaries, as well as material properties and physical relationships among object parts |

Spatial (Coordinate) Reference Systems

VoxelNET uses the following definitions from OGC: 12-063r5: A spatial (coordinate) reference system, SRS, is a "set of mathematical rules for specifying how coordinates are to be assigned to points" (ISO 19111:2007, 4.10). A coordinate reference system is a coordinate system that is related to an object by a datum (from ISO 19111:2007, 4.8), where a datum is "parameter or set of parameters that define the position of the origin, the scale, and the orientation of a coordinate system" (ISO 19111:2007, 4.14). Some forms of coordinate systems include:

Cartesian coordinates give the position of points relative to n mutually perpendicular axes that each have zero curvature (OGC: 12-063r5). In the 3D case, this is the common coordinate system having three orthogonal axes typically labelled as x, y and z, in which points are located by an (x, y, z) coordinate.

Geodetic coordinates (sometimes called geographic coordinates) are a "coordinate reference system . . . based on a geodetic datum" (ISO 19111:2007, 4.23), where a geodetic datum is a "datum . . . describing the relationship of a two- or three-dimensional coordinate system . . . to the Earth" (ISO 19111:2007, 4.24). A primary example of a geodetic coordinate system is the ellipsoidal coordinate system in which "position is specified by geodetic latitude, geodetic longitude and ellipsoidal height" (ISO 19111:2007, 4.18.), represented by ($\Box$, $\Box$, h).

Projected coordinates, or map projections, are coordinate conversions from an ellipsoidal coordinate system to a plane (ISO 19111:2007, 4.33), as used to create two dimensional maps of the Earth's surface. There are many such mathematical mappings, used for different purposes.

Local coordinates include Cartesian coordinates in a non-Earth (non-georeferenced) coordinate system. Local coordinate systems are often used for CAD applications and local surveys.

Engineering coordinate reference systems are coordinate reference systems based on an engineering datum (ISO 19111:2007, 4.21), where an engineering datum maps local reference points to a larger scale coordinate system (ISO 19111:2007, 4.21). An example would be a local Cartesian coordinate system for mapping mine sites (surface and underground), where the local coordinate axes may be rotated in relation to geodetic coordinate datums.

Coordinates expressed in the various different coordinate systems can generally be inter-translated by coordinate transforms. Other coordinate and coordinate reference systems defined in OGC: 12-063r5 can also be able to be accommodated Material Voxels: Material Voxels can be voxels that have specific amounts of a material, consistent with the definition of Material Lots in ISA-95. Material voxels are hierarchically composable and decomposable, in which case the definition of a material voxel within a larger scale material voxel uses the voxel definition to distinguish it from other subsets of the larger scale material voxel. These smaller scale voxels are consistent with the definition of Material Sublots in ISA-95. Material voxels can be associated with class or type information that is not intrinsically spatially located.

Spatially Located Objects and Agents: Material voxels are a subset (of any shape) of spatial objects having volume, while descriptors of material voxels may also be spatially structured or distributed according to other spatial forms (e.g. points or lines of points, etc.). A spatial structure is a set of spatial objects having specific, represented relationships among them. Spatial objects, including Material Voxels, can be: 1) Absolutely present, located and/or bounded, having a single location and clear bounding surface marking when things are in or out of the object. 2) Probabilistically present, located and/or bounded, having a set or zone of locations and/or bounding surfaces representing the probability of an object being at a location, or a point near the object being within or outside of its boundaries.

Spatial locations and objects can have attributes and attribute values associated with them. For example, a block within a mining block model may have attributes representing average metal grades, hardness, and density within the block. Attribute values mean that object descriptions are multi-dimensional, going beyond 3 spatial dimensions and one time dimension. Data attributes represent additional dimensions.

For example, a material voxel could initially represent a block of rock in an ore deposit. When the block is blasted, the material voxel is aggregated with others representing all blasted material in that production cycle. After blasting, the aggregated block may be represented by an association of smaller material voxels having probabilistic locations in three dimensions, as well as probabilistic size distributions that are a function of locations.

Material voxels may be spatially structured or distributed according to other spatial forms (e.g. patterns of points or lines of points, etc.). Material voxels can also be associated with class, type and instance information that is not intrinsically spatial.

Immaterial Voxels: Immaterial Voxels are uniquely identifiable shapes and volumes that have no associated material characteristics. They are virtual constructs that may overlap with location voxels and material voxels, may be static or mobile, structured, and are hierarchically composable and decomposable. Immaterial voxels may have features that spatially located objects and agents also have (see below) and they can be associated with class, type and instance information that is not intrinsically spatial.

Immaterial voxels function to demarcate space for purposes of classification, discrimination of uses, analytics, etc. Examples include airspace shapes, geofences, restricted (e.g. secure) areas, safety buffers, and socio-political zones. Within this text, features of material voxels are understood to potentially apply to immaterial voxels when those features are not dependent directly or indirectly upon having mass.

Probabilistic Locations and Boundaries: Spatial objects, including Material Voxels, can be: Absolutely present, located and/or bounded, having a single location and clear bounding surface marking when things are in or out of the object. Probabilistically present, located and/or bounded, having a set or zone of locations and/or bounding surfaces representing the probability of an object being at a location, or a point near the object being within or outside of its boundaries.

For example, a material voxel could initially represent a block of rock in an ore deposit. When the block is blasted, the material voxel is aggregated with others representing all blasted material in that production cycle. After blasting, the aggregated block may be represented by an association of smaller material voxels having probabilistic locations in three dimensions, as well as probabilistic size distributions that are a function of locations.

Attributes and Annotations of Spatial Objects: Location voxels, material voxels and spatial objects can have attributes and attribute values associated with them. For example, a block within a mining block model may have attributes representing average metal grades, hardness, and density within the block. Attribute values mean that object descriptions are multi-dimensional, going beyond 3 spatial dimensions and one time dimension. Data attributes represent additional dimensions.

Representation of Time: Consistent with OGC: 12-063r5, calendar dates and times will be restricted to the Gregorian calendar, the 24-hour clock and UTC as defined in ISO 8601:2004. Any precision is allowed, and other date formats such as geological eras or calendars other than Gregorian may be stated through a free format quoted text string.

Representation of Motion: Material, Object and Agent Motions will be represented by one or more of: 1) sets of predefined animation steps specified in terms of the rotations and translations of joints of a skeleton model that is part of a geometric assembly; 2) simulation of physics using specific physics engines, including: collision detection, based upon collision volumes/meshes, rigid body dynamics, soft body and fluid dynamics; 3) Mathematical functions describing motions and trajectories.

Representations of Data Sets: Data sets to be imported can include: Point clouds; 3D objects in any format, incorporating one or more of: Mesh models, Object skeleton models, Materials and textures, Animation sets; Topographic, terrain and GIS maps and models; Drill hole data; Blast hole data; Ore body models; Mine block models; Mine architecture and site models; Diverse sensor data, including both archived and live streaming.

Standard Operations and Methods Defined on VoxelNET Spatial Data Objects and entities can include Standard Operations and Methods Defined on Coordinate Systems; Standard Operations and Methods Defined on Location Voxels, Standard Operations and Methods Defined on Material Voxels and Standard Operations and Methods Defined on Spatially Located Objects and Agents.

Voxel Count: In some embodiments, for Earth the voxels are defined in 1 m3 resolution across the earths surface, with a height of 20 km and a depth of 10 km. The total default number of voxels therefore is approximately $1.2782 \times 1019$ m3 or 12.782 exavoxels, requiring approximately 23 bits to represent an address.

In one embodiment, there is provided cubes cover the spherical earth, this means to use a Geodetic system in combination with a Euclidean systemisation. The cubes have to have a structure covering earth and they should not be distorted. By the equator circumference (0 degrees) all cubes are perfectly formed and aligned, with negligible overlap, and carry individual IDs. By the pole(s) all cubes are overlapped, having converged to one single cube location at the pole (at 90 degrees from the equator). Between the equator and the poles adjacent cubes need to progressively overlap longitudinally, while still having clear predefined identifiers. At 60 degrees from the equator towards the pole the cubes are 50%/50% overlapped in the longitude direction.

Primary VoxelNET-MCSR Server (34—FIG. 3)

An API (Application Programming Interface) server interface is defined for accessing the VoxelNET server. The interface is defined in terms of a set of functions and procedures, and enables a program to gain access to facilities within an application. The interface provides a message passing boundary 36, 37 between two functional units, defined by various characteristics pertaining to the functions, physical interconnections, signal exchanges, and other characteristics, as appropriate. The value of APIs is to provide well-known interfaces between components of a software system. The APIs are useful in software development as they support modularity. Well defined interfaces allow separation of functionality into independent, interchangeable modules. APIs are often materialized as web-services, but are also commonly targeted at a specific programming language, such as Javascript. Public APIs enable developers from other organizations to access the functionality provided behind the APIs. APIs are closely related to the role of "platforms". Public APIs may or may not be Open APIs. Being "public" means that the API is visible and accessible outside of the organization that owns the API.

VoxelNET Core Behaviours are functions and operations executed in relation to the VoxelNET Repository. VoxelNET Core Behaviours include: 1) Spatial, geometrical and volumetric database functions, methods and operations for searching, filtering, adding, updating, transforming and deleting spatial, geometrical and volumetric data, entities and attributes/values; 2) Functions for importing and exporting data to and from the VoxelNET repository, including: Point clouds, 3D objects in any format, incorporating one or more of: Mesh models, Object skeleton models, Materials, video, images and textures, Animation sets; Topographic, terrain and GIS maps and models; and, Animation execution and standard physical simulations.

Imported data file types can include: Point Clouds, Geoscience and Terrain Data, Drill Hole Data, Blast Hole Data, Block Model Data, Real-Time Vehicle Data, Mine Design Data, 2D and 3D Maps, and Oceanic Sonar Data.

As far as applicable and practical, VoxelNET Core Behaviours are a superset incorporating or deriving constructs from: ISO/IEC WD 13249-3 Information technology-SQL Multimedia and Application Packages-Part 3: Spatial 3rd Edition.

Server-Side (Back-End)

The server side backend consists of running services connected to a data store implemented in any programming language. Those services are exposed to any existing clients or future clients. The services include storing data to the data store transforming local coordinates system to the chosen standard global coordinate system, querying the data store using location queries (such as latitude, longitude, altitude, name of places and near by places around the globe), updating voxel information to the data store via streaming, retrieving voxel information via streaming, keeping the history of server side access patterns and relevant data, storing client application usage collection metrics to the data store for future improvements, storing client profiles in the data store, registration, authentication and authorization of VoxelNET users, receiving and broadcasting messages in real time for the collaboration of VoxelNET client users enabling them to view, edit, update, share, take screen shots, create standard video file, share and store in the server/authorized client devices of Voxel information in real time. The services will be exposed via standard REST HTTP protocol and the standard websocket protocol. The data store could be any or combination of RDBMS and/or NoSQL solutions.

Analytics services implemented in any programming languages run on top of data stored inside our data store to identify client application user behavior, to gather data driven insights and to improve VoxelNET user experiences.

Reporting services implemented in any programming language run on top of analytics results' data to provide human readable social, economical, technical or scientific VoxelNET reports.

Opensource technology stack is used for the development of VoxelNET server side backend platform.

Voxel Editor (60 of FIG. 3)

Figure 6:
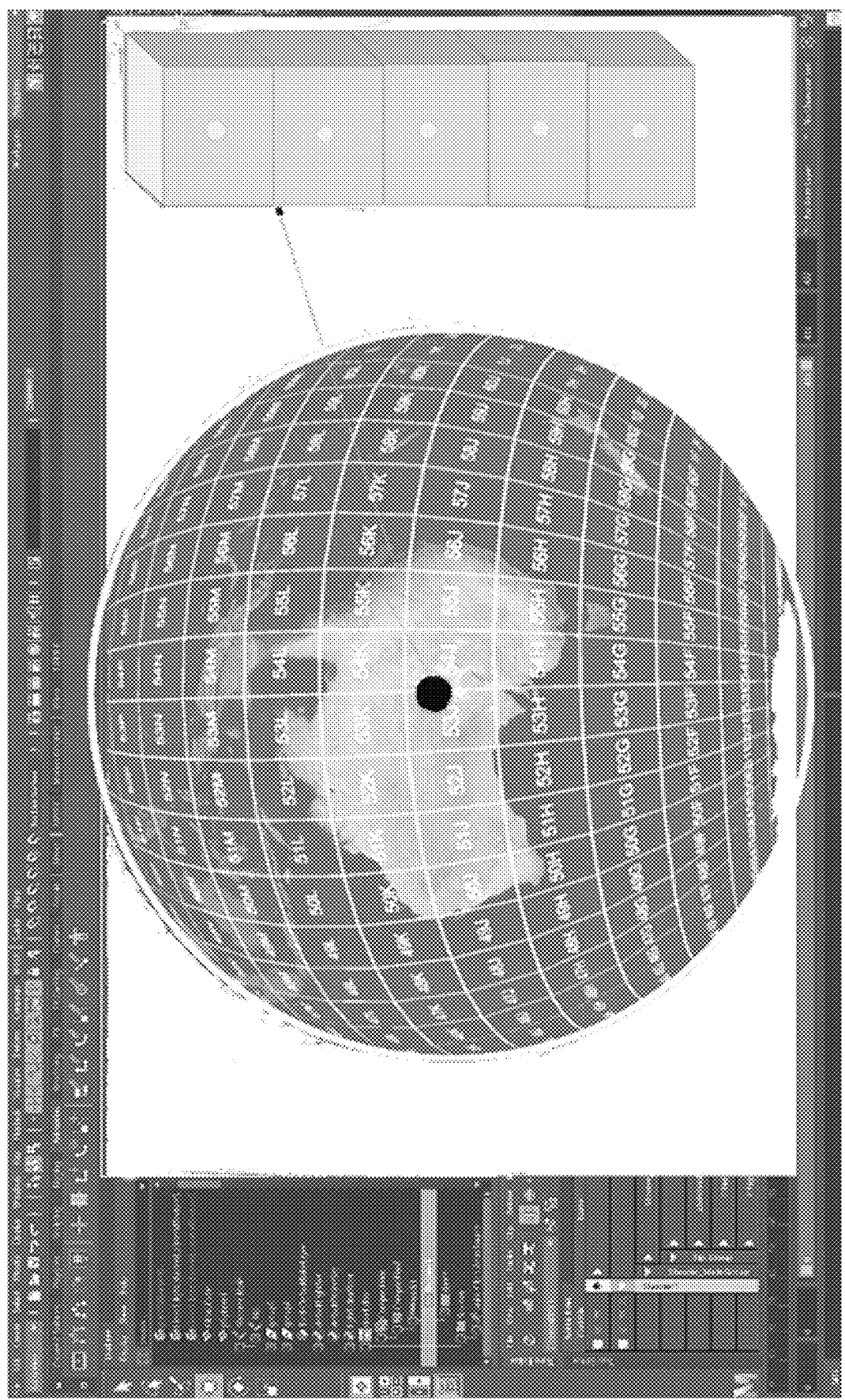
FIG. 6 illustrates an example voxel editor interface.
Figure 7:
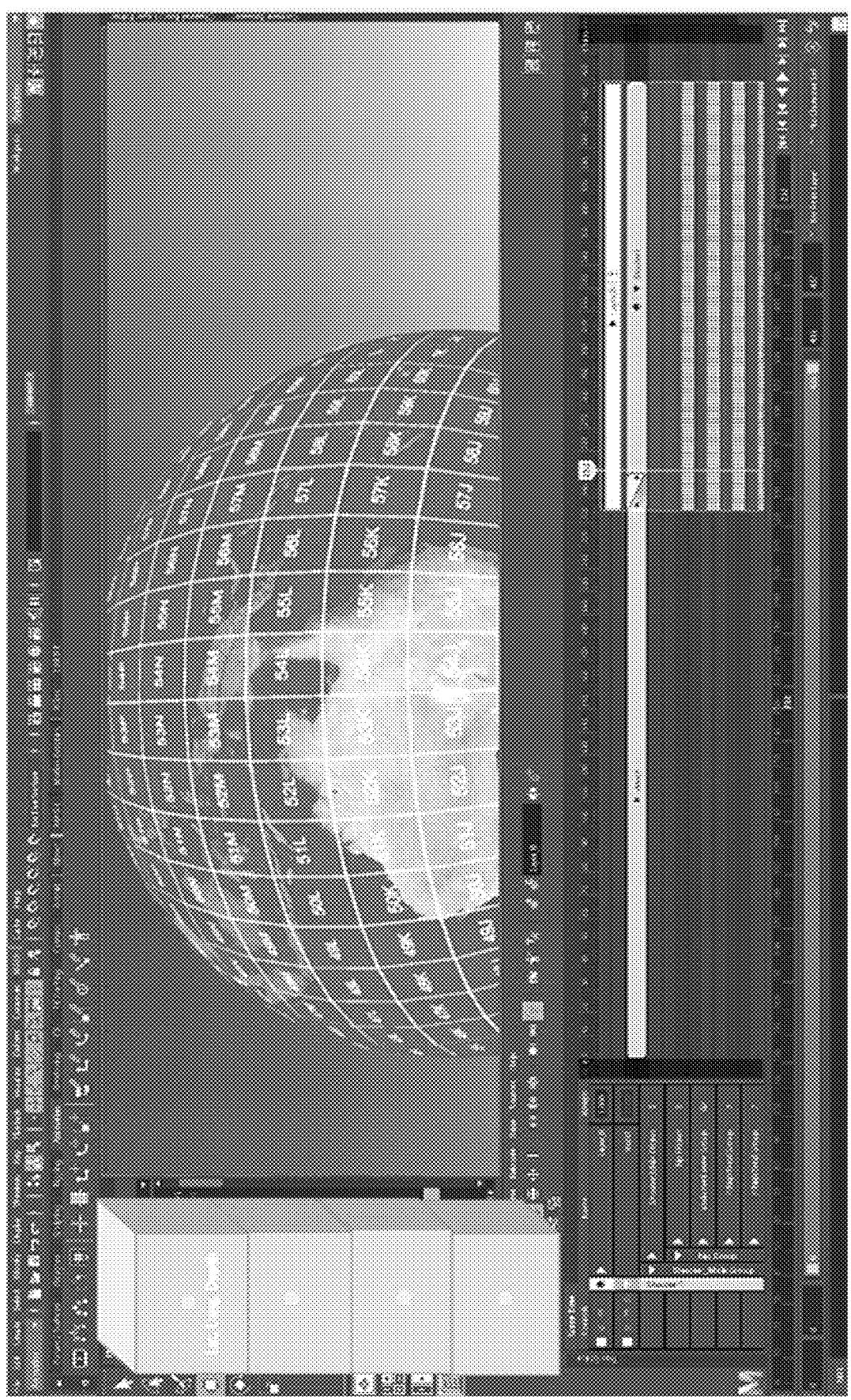
FIG. 7 illustrates a further example of the voxel editor interface.

The VoxelNET system can include an editor so the user(s) can access and interact with the functionalities of the voxel(s). An example editing style is illustrated 61 in FIG. 6. The editor is not just a text dialogue window to search information via words—this is to search voxels/volumes, and can include a 3D earth covering much of the screen with a top screen menu and drop down windows with toolbars etc to support voxel interaction such as defining volume of interest, linserting numerical, 2D and 3D data, preferable lay-out options, zoom functions, data column linkage, voxel linkage via spatial location, voxel defined paths for data to travel, alerts predefined to certain variables/cross correlated variables.

The editor is designed to meet various user requirements depending on the aimed use. The interface provides a means for choosing various sensors at different locations and cross correlating these (real time and stored data). The editor should be able to connect to various data bases so as to access data files already being stored. It is also important to visualise 3D data and display it (rendered, voxelised, heat maps, grade, etc). The editor should be able to stitch together various 3D files (.obj., .pcl, .stl, etc.), run manual defined and machine learning 3D algorithms through user predefined space/volume, have machine learning functions accessible, a state monitoring and alerting system, time and volume user defined options and so on.

Figure 8:
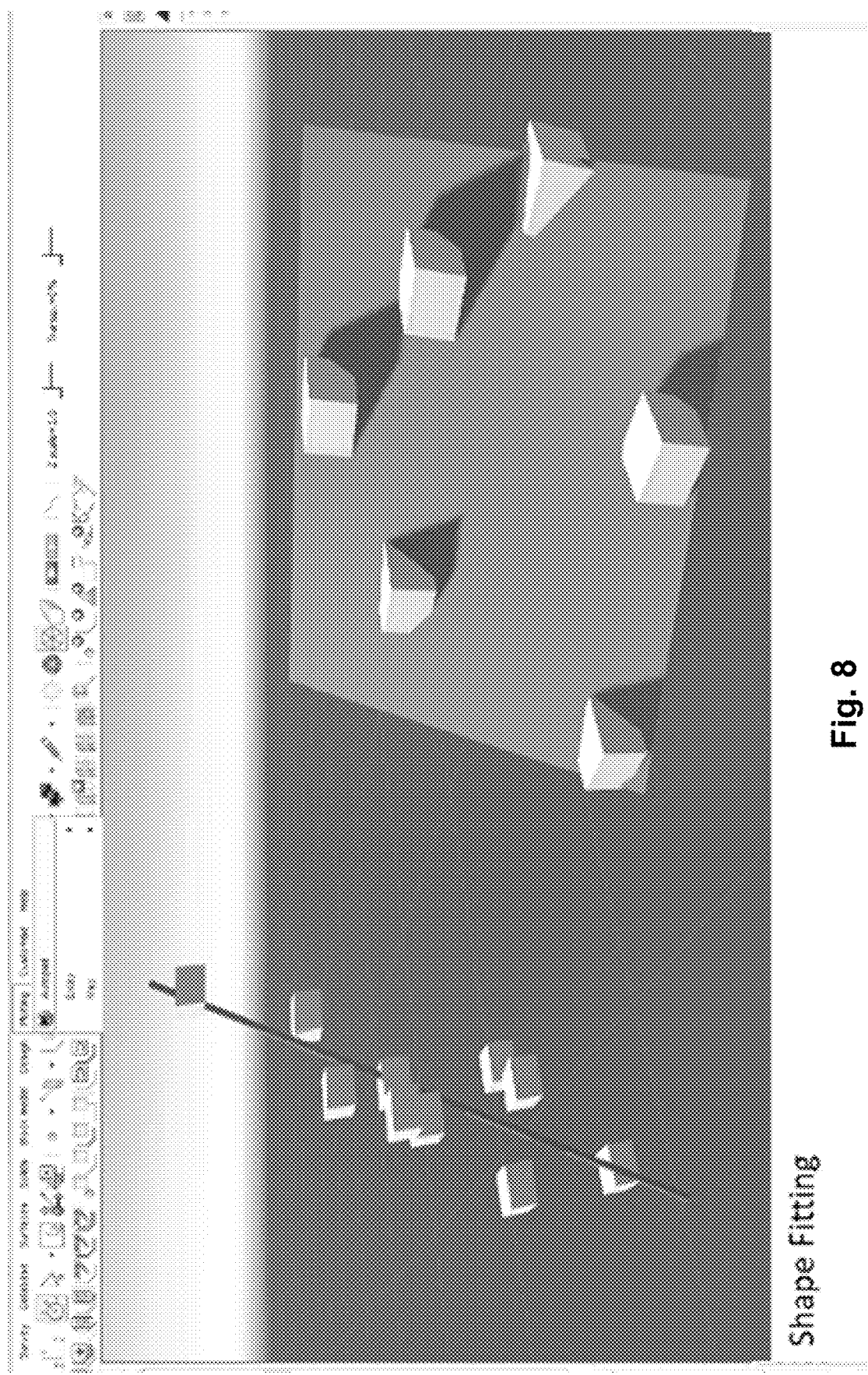
FIG. 8 illustrates a process of curve and surface fitting to voxel data.
Figure 9:
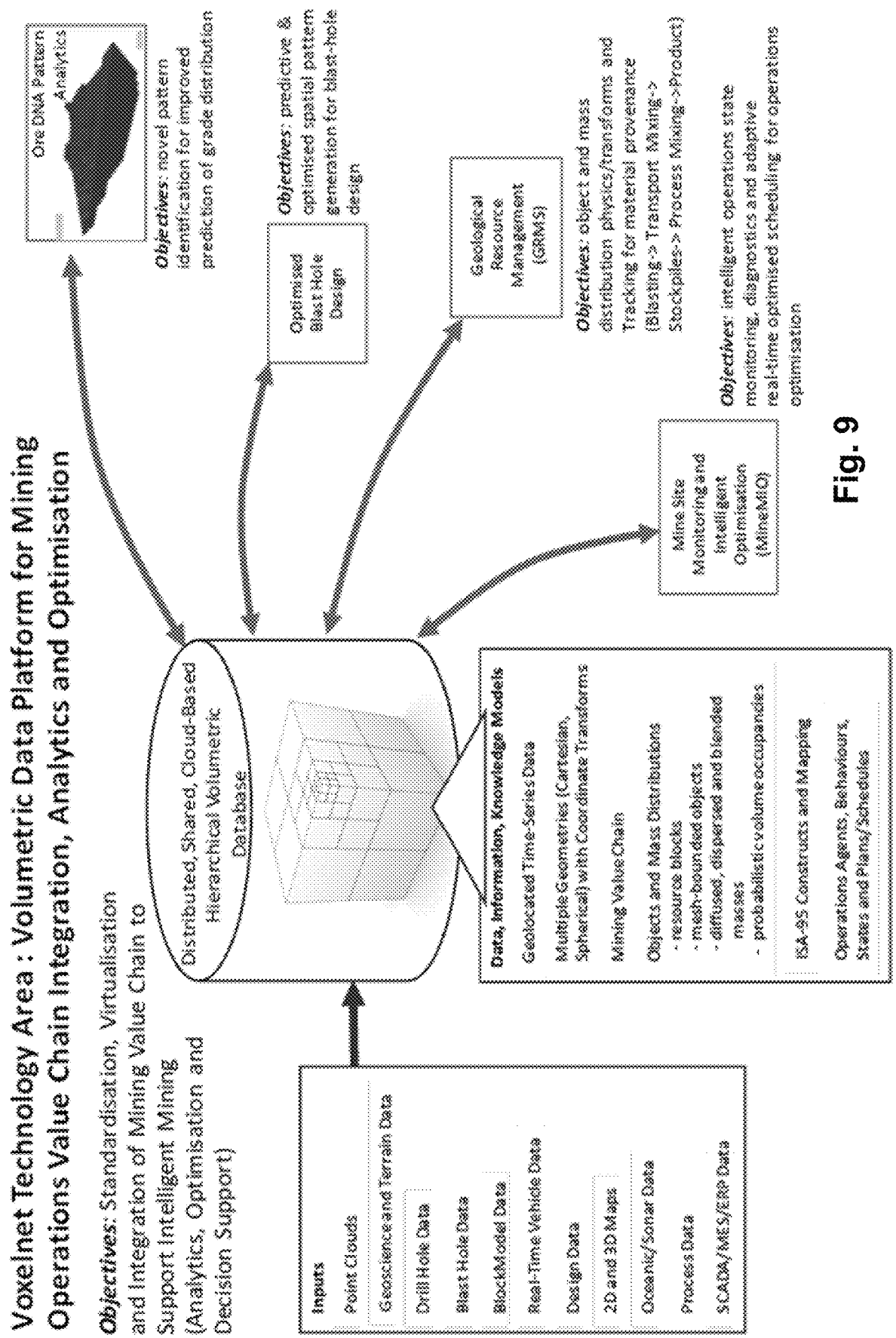
FIG. 9 is an illustration of the potential uses of the VoxelNET system currently being implemented in active projects.
Figure 10:
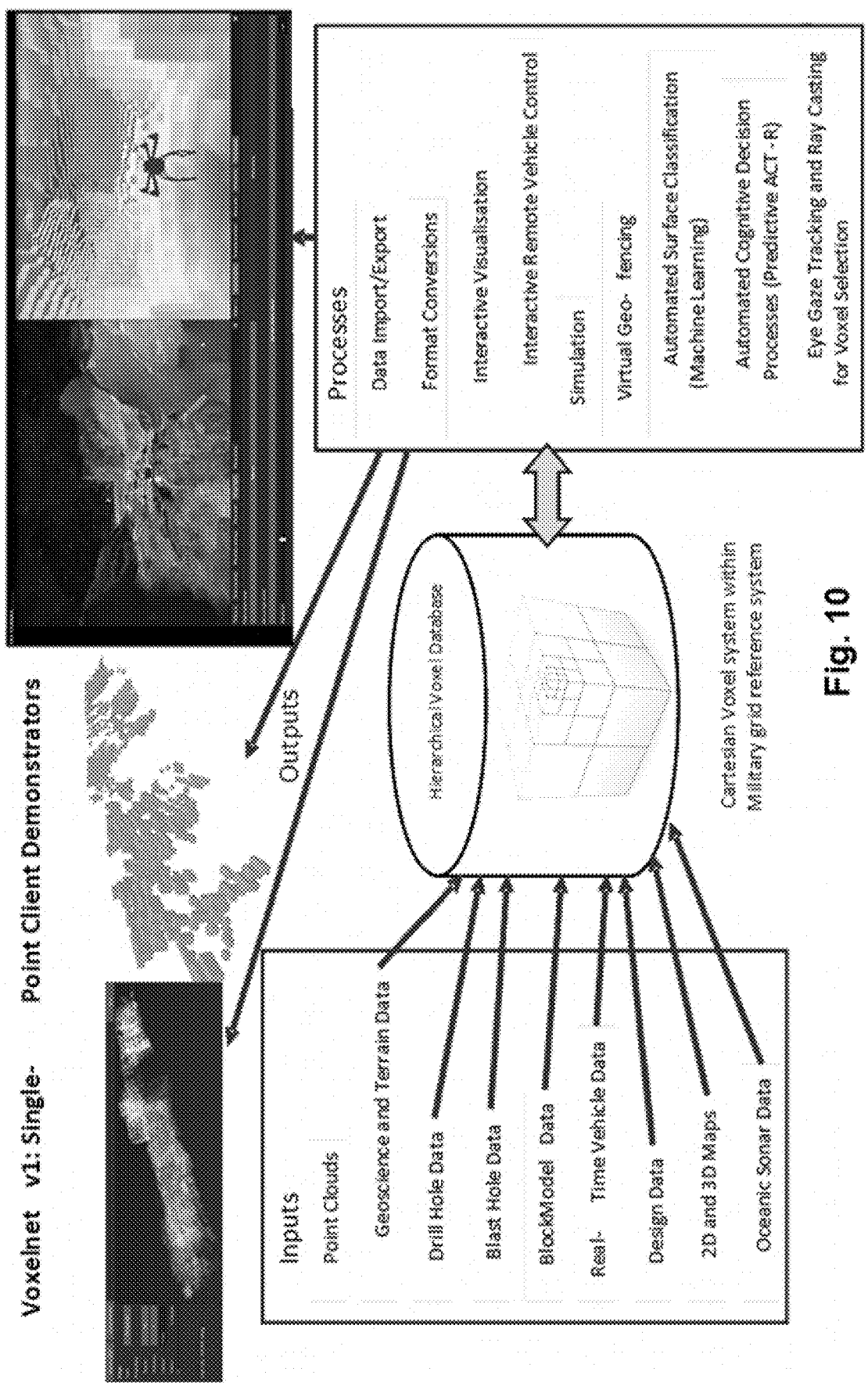
FIG. 10 illustrates a single point client demonstrator of the VoxelNET system.
Figure 11:
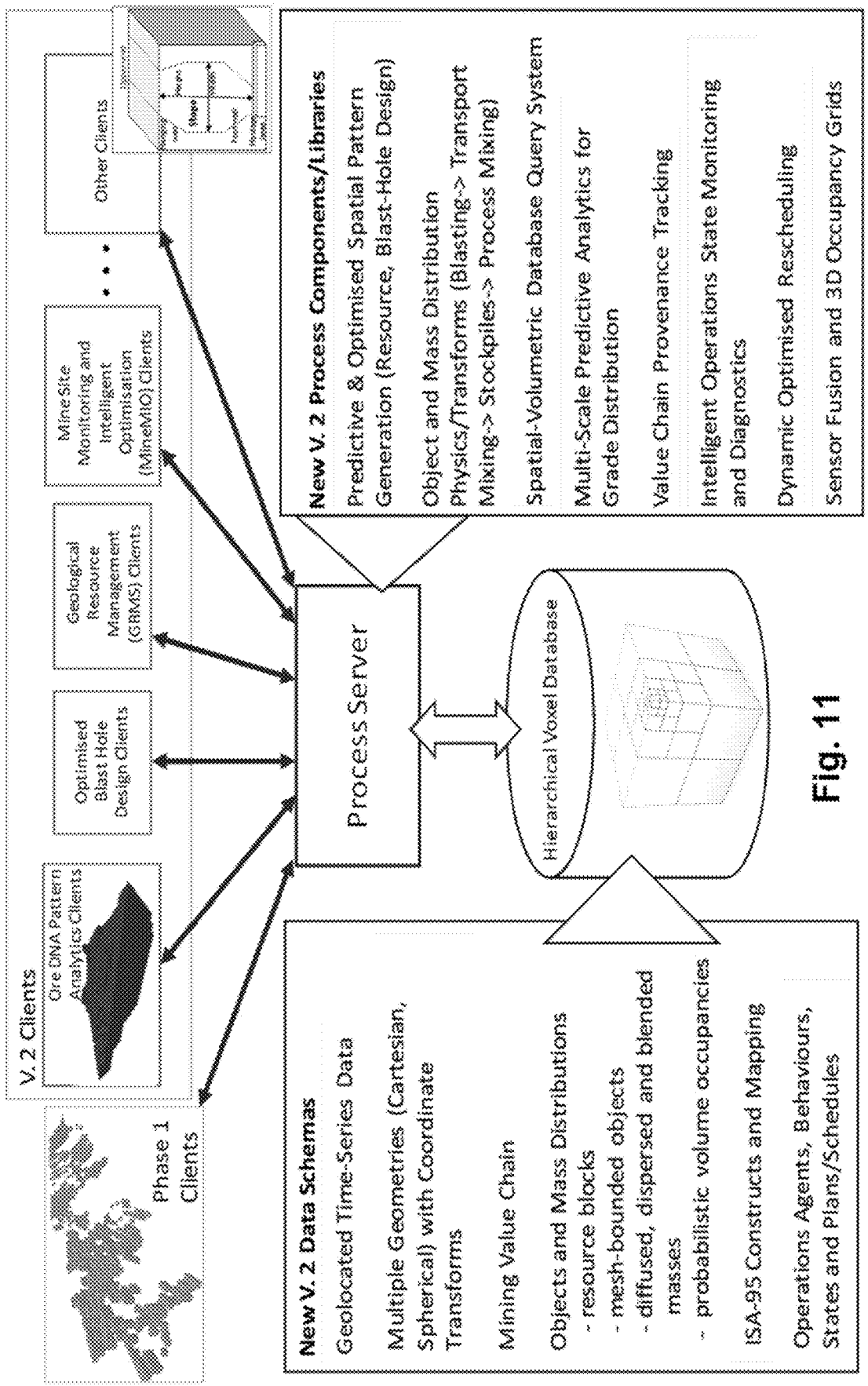
FIG. 11 illustrates a multi client demonstrator for the VoxelNET system.

Generic Use Cases and Work Flows: To demonstrate generic use cases and workflows, a user friendly interface is desired. Generic visualisation functions on VoxelNET data can include: Tilting, panning, zooming, and traversal around 3D representations; Display of all forms of geometry; Point clouds; Colours, textures and materials; Filtering by object attribute values and value combinations, with setting of colours for specific filtered values; Geometrical subsetting, slicing, selection, and filtering by these simultaneous views of different visual representations FIG. 8 illustrates one form of display of voxel data 80. Various view perspectives can be provided, such as first and third person, isometric etc. Generic visualisation functions can include: Tilting, panning, zooming, and traversal around 3D representations; All forms of geometry; point clouds; Colours, textures and materials; Filtering by object attribute values and value combinations, with setting of colours for specific filtered values; Geometrical subsetting, slicing, selection, and filtering by these simultaneous views of different visual representations; Varied view perspectives, such as first and third person, isometric; Support for very large model views; Rapid real-time rendering (direct streaming from disk to graphics cards)

A voxel editor can provide the ability to make changes to an existing dataset by: Adding new voxels; Selecting voxels; Removing voxels; Modifying attributes of existing voxels.

Multi-User Interaction can also be provided with the ability for multiple users to collaborate in one session with: Shared datasets; Shared visualisation parameters; Visualisation updates pushed to all users; Analytics updates pushed to all users (including newly generated processed datasets); Analytics Editors; Kernel-Based Volumetric Analytics;

Perform 3D image processing techniques on an existing dataset to produce a new dataset analogous to image filtering in 3 dimensions. This can include such functions as: Selection from a list of preset kernels for different uses (edge detection, etc.); Dataset and attribute selection/isolation; Choice between additive process (processing is performed on visible voxels) and offline process (processing is performed on entire dataset)

Client-Side (Front End) Message Handler (37 of FIG. 3).

General Format: Data transactions can have the form of messages represented using JSON (see: http://www.json.org/). Basic message types can include: "NEW" indicates a new object, entity, or relationship; "UPDATE" indicates a change to an attribute or relationship of an object or entity; "DELETE" indicates removal of an object, entity or relationship.

The JSON format of a message will be: {"VoxelNET": [{"message-type": message type, data name 1: data value 1, data name 2: data value 2, data name 3: data value 3, . . . to the number of data fields and values}]}

Message Types: Messages that can actively change the database are mostly limited to those communicating information about states and events.

Interoperability: Interoperability will be supported and implemented by: Open data schemas and formats; Conformance to relevant standards, including ANSI/ISA-95 Enterprise Control System Integration and ISO/IEC WD 13249-3 Information technology-SQL Multimedia and Application Packages-Part 3: Spatial 3rd Edition; Import and export functions for a wide range of data formats (expandable); Plug-in architecture for integrating third party modules; Application programming interfaces (API) for all functions and Open extensions to standards for new defacto standard features for VoxelNET system users.

Other standards that can be used for data transfer including: ANSI/ISA-95 Enterprise Control System Integration: See: https://www.isa.org/isa95/. Business To Manufacturing Markup Language (B2MML): See: http://www.mesa.org/en/B2MML.asp. B2MML consists of a set of XML schemas written using the World Wide Web Consortium's XML Schema language (XSD) that implement the data models in the ISA-95 standard. ISO/IEC WD 13249-3 Information technology-SQL Multimedia and Application Packages-Part 3: Spatial 3rd Edition See: https://www.iso.org/standard/53698.html. ISO/IEC 13249-3:2011 defines spatial user-defined types, routines and schemas for generic spatial data handling. It addresses the need to store, manage and retrieve information based on aspects of spatial data such as geometry, location and topology. Implementations of ISO/IEC 13249-3:2011 may exist in environments that also support geographic information, decision support, data mining, and data warehousing systems. Application areas addressed by implementations of ISO/IEC 13249-3:2011 include, but are not restricted to, automated mapping, desktop mapping, facilities management, geoengineering, graphics, location-based services, terrain modelling, multimedia, and resource management applications.

OGC 06-104r4: See: http://www.opengeospatial.org/standards/sfs

The VoxelNET system can include many refinements and options. For example, the VoxelNET Core is an integrating spatial and volumetric data management system that can be implemented on local and global scales. Spatial objects, including Material Voxels, can be: 1) Absolutely located and/or bounded, having a single location and clear bounding surface marking when things are in or out of the object. 2) Probabilistically located and/or bounded, having a set or zone of locations and/or bounding surfaces representing the probability of an object being at a location, or a point near the object being within or outside of its boundaries.

Spatial locations and objects can have attributes and attribute values associated with them. For example, a block within a mining block model may have attributes representing average metal grades, hardness, and density within the block. Attribute values mean that object descriptions are multi-dimensional, going beyond 3 spatial dimensions and one time dimension. Data attributes represent additional dimensions. For example, a material voxel could initially represent a block of rock in an ore deposit. When the block is blasted, the material voxel is aggregated with others representing all blasted material in that production cycle. After blasting, the aggregated block may be represented by an association material voxel type consisting of smaller material voxels having probabilistic locations in three dimensions, as well as probabilistic size distributions that are a function of locations.

Examples of the platform software functions and services that VoxelNET can provide includes: Highly generic spatial, geometrical and volumetric data modelling, representation, manipulation, access and management. Generic functions for user management, permissions and access control. Support for multiple client side users of repositories. Support for the integration and sharing of disparate repositories via a mediating virtualisation layer. Standardised analytics libraries and free form scripting of user defined analytical scripts and programs. Data archiving, time-series analysis and data mining. Scaleable cloud-based storage and processing. Standardised and open data models, schemas and application program interfaces (APIs). Support for bespoke plug-ins. An integral programming environment offering specialised spatial, geometric and volumetric constructs.

VoxelNET computing is achieved via several programming paradigms, of which Agents are a high level example. These paradigms include: Scripted programs that sit outside of the voxel structure and traverse it to achieve outcomes such as: i) finding voxels that meet some criteria (i.e. data base querying, data filtering), ii) analysing voxel collections, iii) parsing and editing subsets of voxel space. Triggers associated with specific voxels are (logically or conceptually) within a voxel, such that if their associated data changes, one or more defined computations are carried out. An example is, if a a location voxel is mined, this can trigger the spawning of a material voxel. Since the voxel structure is hierarchical, and voxels can be members of a larger scale voxel or association, triggers can be inherited (upwards or downwards).

Processes associated with specific voxels are (logically or conceptually) within a voxel/structure, and run continuously, carrying out one or more defined computations. An example is, a voxel process interrogates a defined neighbourhood of voxels to check if any have been mined, and to derive a cost/value hypothesis from the mined states of its neighbours, their rock harness, grades, etc.

Finite state machines (FSMs) are state transition engines that move a sequence of voxels from one state to another in response to changes in one or more of the voxels (i.e. inputs, or internally driven state changes). They fall between triggers and processes, since they are complex sequences, but driven by trigger events, rather than running continuously.

Agents are more complex computational processes based upon any of a range of computational cognitive models. The most critical features of agents include declarative knowledge modelling and goal-directed decision processing. Social agents are a specialisation of computational agents that can engage in collaborative or competitive behaviour (for example). A voxel or voxel association can be an agent if some part of its behaviour is controlled by a cognitive model.

Given the VoxelNET infrastructure, a series of interdependent applications (e.g. 31 of FIG. 3) can be built upon the VoxelNET platform and provide an alternative to traditional block model methods for mineral resource modelling, valuation and mine planning. A number example application will be hereinafter described.

Sensor Management Example: Real-Time UAV/Robot Mapping

Figure 12:
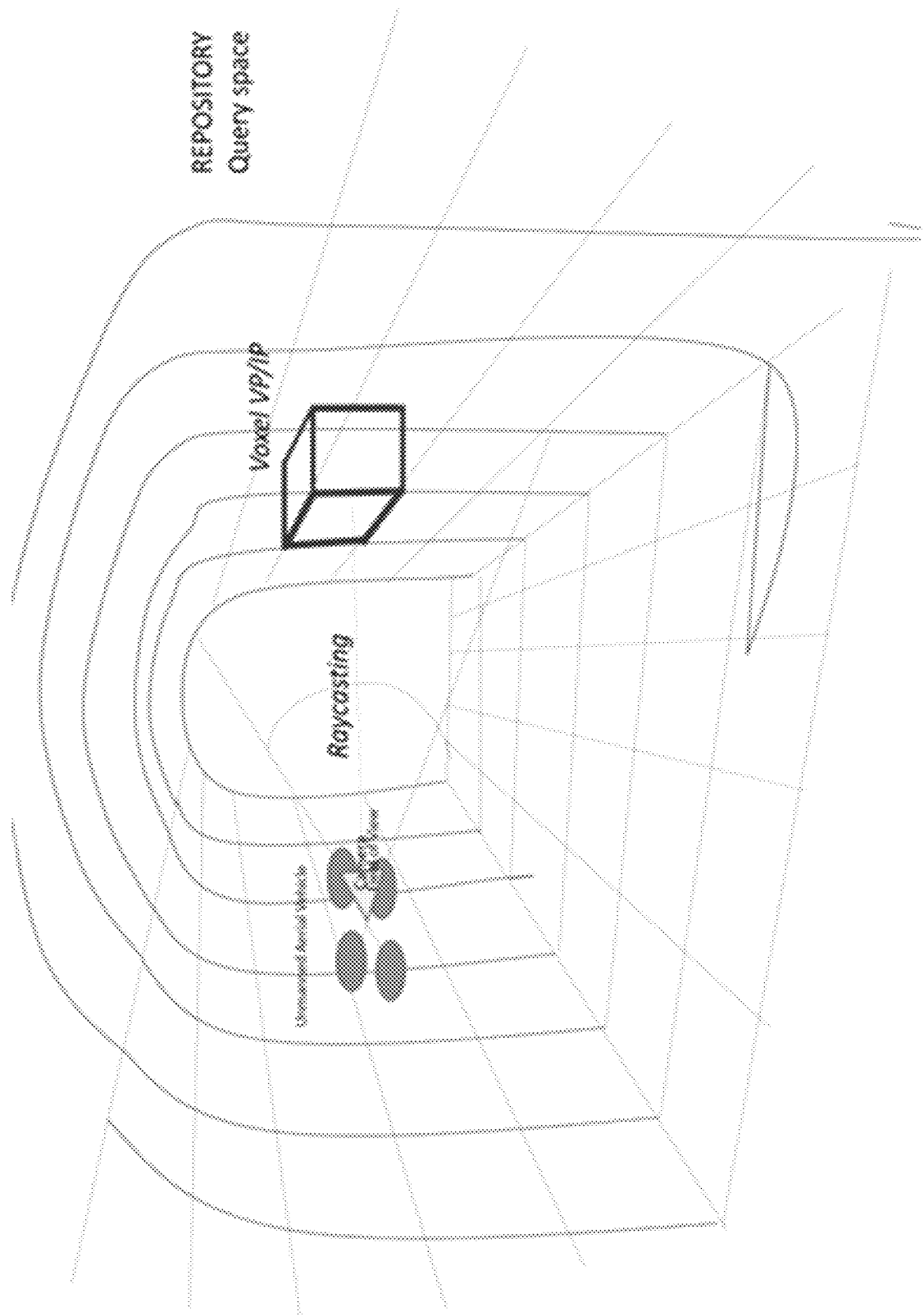
FIG. 12 illustrates an example process of raytracing simultaneously in Voxel space and real space.

A linked UAV flying (or any moving object recording video, such as a person, robot or vehicle), and recording the environment via video (frame by frame) or pointcloud can be replicated in the voxelised digital world. The video recorded pointing outwards from the UAV will make use of a ray casting beam/line indicating what unique voxel(s) it will be sorted and associated with in the repository. The UAV's geo location and the camera(s) located on the UAV will indicate what start location the ray has and while the UAV moves forward the ray indicates what frames in the video will be associated. FIG. 12 illustrates an example of this approach.

VoxelNET provides a platform for representing and reasoning about 2 dimensional and 3 dimensional space, time, materials and industrial processes. The applications described in this document use these VoxelNET capabilities to realise and demonstrate new approaches to resource modelling. These include: 1. Multi-Dimensional Resource Modelling with Resource Model Fusion for Cost/Value Calculations; 2. Dynamic Multi-Geometry Resource Voxelisation; 3. Optimized Dynamic Mine Planning and Scheduling Based Upon Multi-Dimensional and Multi-Geometry Resource Models.

Adaption of Traditional Resource Modelling Block Models

Most mineral resource value estimates are obtained using three dimensional block models (block modelling is described in the standard textbooks, for example by Rossi M. E. and Deutsch C. V., 2014, Mineral Resource Estimation, Springer). Block modelling involves a tessellation of the resource into rectangular prisms arranged into a regular 3D grid. Block models may be two-dimensional for highly stratified deposits (in which case the depth dimension is assumed to be consistent), representing the content of one stratum or with separate models for different strata, while 3D block models are used for deposits having significant structure or variability in the depth dimension. The present embodiments focus on 3D block models, although all principles described apply in a 2D form to 2D block models. The major function of block models in both cases is to map out characteristics of the deposit, spatially quantized into the volume elements represented by blocks and derived from rock samples from the Earth's surface or obtained as cores from exploration drilling, together with geological interpretations based upon these samples, surface topological features, etc.

Positions within the block model are normally defined in relation to local mine specific three-dimensional Euclidean spatial reference systems (SRSs), typically based upon the major spatial features of the ore deposits, such as the strike (its azimuth orientation) or dip (angle of decline from the surface), or aligned with a regional geodetic SRS.

Block shapes, sizes and the overall geometry of a block model are important decisions that depend upon deposit characteristics, geological features being modelled, and mine planning considerations such as type of mining, equipment size and type.

Block size is a trade-off between the accuracy of prediction at the block level, favouring larger blocks encapsulating more drill hole sample data, and mine planning, favouring smaller blocks amenable to the scale of shift, daily, weekly or monthly planning cycles. Journel, A. G & Huijbregts, C. J. (Charles J.) (2003). Mining geostatistics. The Blackburn Press, New York, proposes that block size should be approximately ⅓ to ½ of the drill hole data spacing; not smaller, in order to avoid artificial smoothing of the model, and not larger to avoid underutilisation of the drill hole data resolution. Block sizes can also be influenced by the size of Selective Mining Units (SMUs), understood as the smallest volume of material that can be selectively classified and extracted as either ore or waste (Sinclair A. and Blackwell G. 2002 Applied Mineral Inventory Estimation. Cambridge University Press, United Kingdom). SMU size is based upon production methods, equipment size, expected grade control practices, available data, and experience. A typical SMU size for underground mining is 5 m×5 m×5 m.

Blocks tend to be of a consistent size where there are limited drill hole and geological data available, typically in early exploration and pre-feasibility phases. Small-size blocks (e.g. obtained by subdivision) are justified by a corresponding scaling of geological complexity and available associated data, most often to model contact zones between ore and gangue domains to allow for more accurate estimation of dilution at these boundaries. Rossi and Deutsch (2014) suggest that sub-block grades should be inherited from parent blocks. In general, instead of creating sub-blocks, it is also possible to add more attributes to a block and use them to estimate and represent characteristics of multiple geological units within the block as attribute values, based upon separate 3D models of the geological units or derived from higher spatial resolution drill core data.

The most basic block model data includes: the position and size of the block, the grades of its content of minerals of interest, which may include both ore and gangue minerals, in situ bulk density of different geologic units, the presence of air and/or water, codes for lithology, mineralisation type, degree of oxidisation, alteration, structural information, estimation domains, presence of clays or unconsolidated material, rock hardness, bond mill indexes, crushing plant throughput estimation and metallurgical recoveries.

Attributes of block models are used to generate estimates of costs to mine per block, as well as value per block as a function of target metal or mineral grade.

There are a number of commercial software packages used by the mining industry for block modelling, providing visualisation of block models, allowing them to be filtered, colour coded, and the results displayed, e.g. to only show ore, ore types, or specific ore grades. Reports can be generated from filtered results, e.g. representing volumes and masses of different grade ranges for a target mineral in a block model. Block models can be created and filled from sample data (e.g. a drill hole database) containing attribute values of interest and (x, y, z) coordinates for the spatial location that the attributes represent. The attribute values in the block models can be estimates derived from sample data.

Commercial software also provides a number of estimation methods, including Nearest Neighbour, Inverse Distance, Ordinary Kriging and Indicator Kriging. Anisotropy ellipsoid parameters (bearing, plunge, dip, axes and maximum search distance), representing structural features of the ore body, can be used to define the zone within which sample data must occur in order to be assigned to a block. Block model and minimum block sizes can be specified by the user, usually the long term mine planner. Block attributes can include calculated attributes, derived from formulae specified by the user and applied to the values of other attributes (e.g. block_volume=x*y*z; block_mass=block_volume*specific gravity). An existing block model can be re-blocked, which means restructured using different minimum block size, where the attribute values for the new blocks are automatically calculated from the previous block model attributes according to user-specified criteria. The resultant reblocking can then be uploaded to the VoxelNET storage for access.

Development 1: Multi-Dimensional Resource Modelling with Resource Model Fusion for Cost/Value Calculations An initial problem is the limited accuracy for resource valuation due to limited integration with other resource models for cost assessment. One manifestation of this is the use of a single cut-off grade for a mine site, where actual economic grades vary by location within the site as a factor of parameters other than metal grade, such as geotechnical and geological characteristics that influence costs of extraction by location.

The embodiments, when implemented under the VoxelNET architecture, provide a multi-dimensional resource modelling with resource model fusion for Cost/Value Calculations which provides a much more accurate assessments of cutoff grades of a variable nature, accounting for cost variabilities as a function of variations of material properties at different locations in the resource.

Conforming to existing and evolving practice, any number of 3-dimensional (3D) models of the resource can be created, each involving a number of data values, and structure, shape, process, etc. components of the resource. Some typical examples of these models for a given resource include:

1. A model of exploration drill core data obtained from the resource. Drill holes can be regarded as approximately straight lines through the resource, with data points collected systematically along the lines using a range of technologies and/or human observations. Data collected can be highly complex, although simple schemes can include measures such as rock hardness, type, moisture content, fracturing and filling, discontinuities, separations, asperities and metal grades based upon detailed assays. Sample values may be taken at regular intervals (e.g. 1 m for manually collected data, 1 mm or less for automated scans). Logged drill core data values provide a cloud of points through the resource upon which more specific models can be built. These can than be uploaded to the VoxelNET storage facility.

2. Geological models based upon broad regional geological understandings, surface topological features, surface samples, data from existing (perhaps legacy) mines and analyses of drill core data. Geological modelling can take wide area and lower resolution data into account, such as gravitational and geomagnetic mapping, radiometry, and seismic studies. Geological modelling may draw upon comparisons with other mineral deposits and take into consideration theories of ore body formation processes. As such, they may have large elements of interpretation and/or hypothesis associated with them, especially as the deposits are more complex or of poorly known/understood types. Contents of geological models include geological layers and thicknesses, rock types, intrusions, ages, sedimentation environment and sequences, sea bed and riverbed locations and changes, oxidation and weathering, etc.

3. Geotechnical models are concerned with the mechanical properties and behaviours of material in the deposit, including hardness, fracturability, the existence of micro- or macro-scale fractures, permeability, strength, compressibility, water levels, elasticity/plasticity, etc. Geotechnical models are also concerned with changes to the distributions of energy and stability/instability through the rock mass in relation to engineered characteristics of the deposit as mining progresses.

4. Geomorphology models are concerned with past, present and future water flows within and around the mining site, both on the surface and underground. This includes flows through fractures, fissures and fault lines, within naturally formed underground waterways (e.g. caves), the presence of aquifers, and flow changes due to weather events and mining processes.

5. Geochemical models derived from "the measurement of the chemistry of the rock, soil, stream sediments or plants to determine abnormal chemical patterns which may point to areas of mineralisation. When a mineral deposit forms, the concentration of the ore "metals" and a number of other elements in the surrounding rocks is usually higher than normal. These patterns are known as primary chemical halos. When a mineral deposit is exposed to surface processes, such as weathering and erosion, these elements become further distributed in the soil, groundwater, stream sediments or plants and this pattern is called a secondary chemical halo. Secondary halos aid in the search for deposits as they normally cover a greater area and therefore the chance of a chemical survey selecting a sample from these areas is greater than from a primary halo area. Different elements have different "mobility" in the environment based on their readiness to dissolve in water, their density, their ability to form compounds with other elements and the acidity (pH) of the environment. Subsequently, the secondary halo may not contain the "metal" for which a geochemical survey is searching but other "marker" elements.

6. Conventional resource block models that quantize the resource into (typically regular) 3D matrices. The function of block models is to extrapolate from the point data obtained by resource drilling and geological modelling to provide estimates of data values for the complete blocks derived from the point measures provided by resource drilling. Block models are not the only method for doing this, but predominate in modern mining due to their ready use for mine operations planning. Different mines may use different models or variants/combinations of models, and the production of models follows from work flows that may also vary between sites and companies.

Block models tend to become a repository for data from other model types, such as geology, geotechnology, geomorphology and geochemical models. This is typically done by adding descriptors and data values for these data and model categories to the blocks in the block model. This can create a great loss of information, since details of the models become averaged over blocks, which can have dimensions of, for e.g., 15 m×15 m×bench height in an open pit mine. Dimensioning of blocks for grade estimation from drill hole data is influenced by avoiding unnecessary smoothing or averaging by using blocks that are too large, or creating the illusion of higher spatial accuracy for blocks that are too small. However, the dimensions used for grade estimation may represent loss of detail for measures derived from other models with values that are averaged through a block. Since the latter features can bear upon mining costs, this can lead to lower quality cost estimates than those supported by the currently described invention in uploading the data to a VoxelNET architecture.

Figure 13:
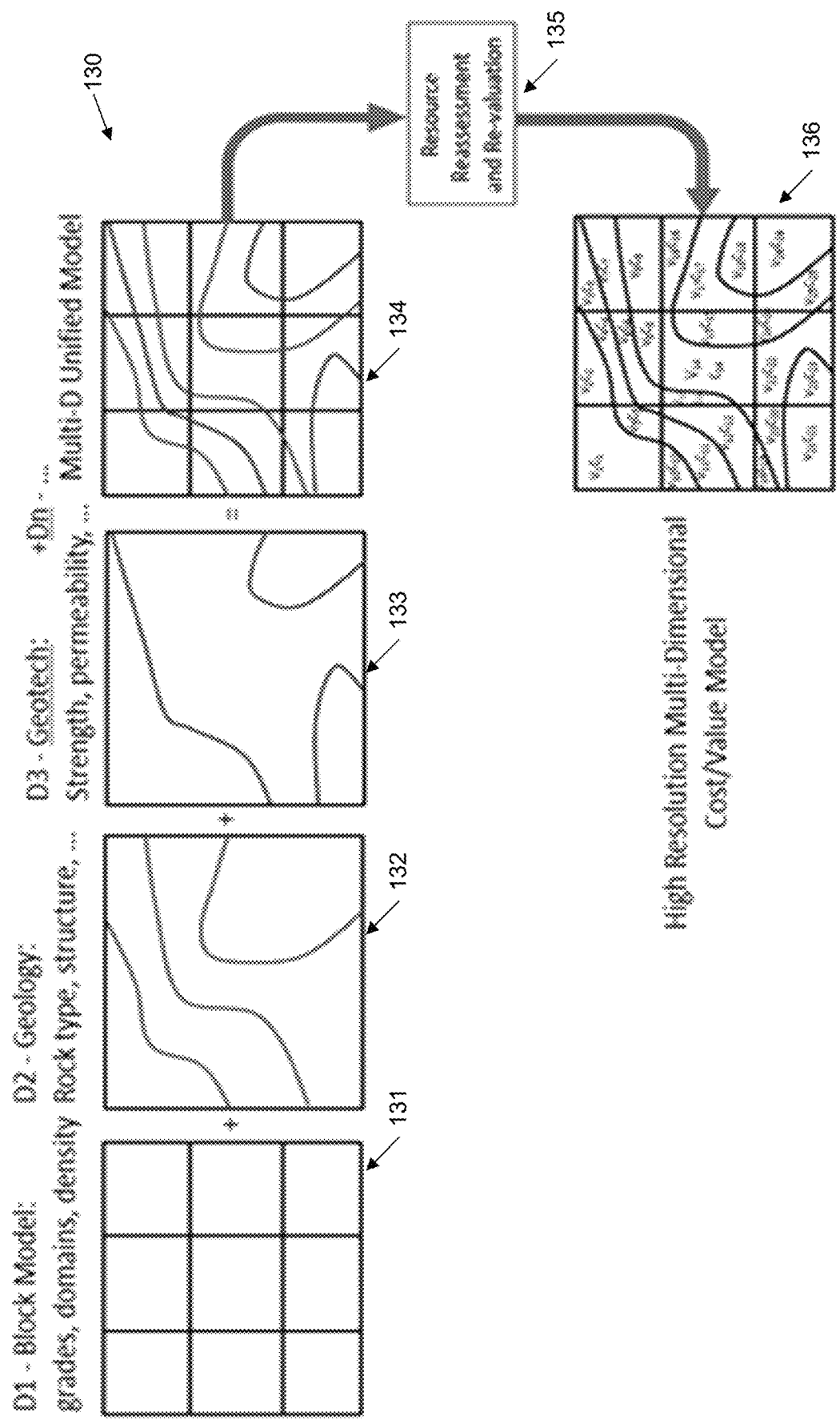
FIG. 13 illustrates schematically a process of merging multiple models.

FIG. 13 illustrates a simplified representation of merging several types of resource models into a unified high resolution Multi-Dimensional Cost/Value Model.

The general procedure for the technology solution includes the following steps:

1. Designate or specify a common spatial coordinate reference system (SRS). This will typically be site specific with known transforms to regional SRSs that are typically commonly used SRS datums (e.g. WGS84).

2. Designate/select the resource models 1 to n to be used.

3. For each model, transform its spatial coordinate reference system (SRS) to the designated common local Euclidean SRS.

4. Set Merged Model=Model 1.

5. In this step, the models are merged and subvoxellized into the VoxelNET. The pseudo code can be as follows:

```
For models i =2 to n - 1, where n is the number of models:
    For every Shape j in Merged Model =:
        For every Shape k in model i:
            Take the Intersecting or Overlapping shapes of
            Shape j and Shape k; (Intersect= Intersection(Shape j, Shape k))
            Take the Subshapes from Shape j that are not part of the Intersection of
```

```
        Shape j and Shape k:
           (NoIntersectWithK= Difference(Shape j,Intersection(Shape j, Shape k)))
           Take the Subshapes from Shape k that are not part of the Intersection of
           Shape j and Shape k
           (NoIntersectWithJ= Difference(Shape k,Intersection(Shape j, Shape k)))
        End For
        If Intersect is not empty
           Remove Shape j from Merged Model
           Add Intersect to Merged Model
           Add Attribute Types/Values of Shape j and Shape k to Intersect (measures for
           total initial voxel, e.g. mass, to be divided by subvoxelized volume/initial voxel volume)
           Add NoIntersectWithK to Merged Model
           Add Attribute Types/Values of Shape j and Shape k to NoIntersectWithK
           (measures for total initial voxel, e.g. mass, to be divided by subvoxelized volume/initial voxel
           volume)
           Add NoIntersectWithJ to Merged Model
           Add Attribute Types/Values of Shape j and Shape k to NoIntersectWithJ
           (measures for total initial voxel, e.g. mass, to be divided by subvoxelized volume/initial voxel
           volume)
        Else If Intersect is empty
           Add Shape k and its attributes to Merged Model
        End If
     End For
  End For
```

6. For all shapes i=1 to m in the Merged Model, where m is the number of atomic shapes in Merged Model:
   Calculate the value of shape i as a function of all Attribute Types/Values of the shape.
   End For The merging process is illustrated 130 in a highly simplified, 2D cartoon form in FIG. 13. In the example, a first block model 131 is merged with a Geology model 132, a Geotech model 133 to produce a unified model 134. This unified model is then subject to reassessment and reevaluation 135 so as to produce a multidimensional cost/value model 126.

Figure 14:
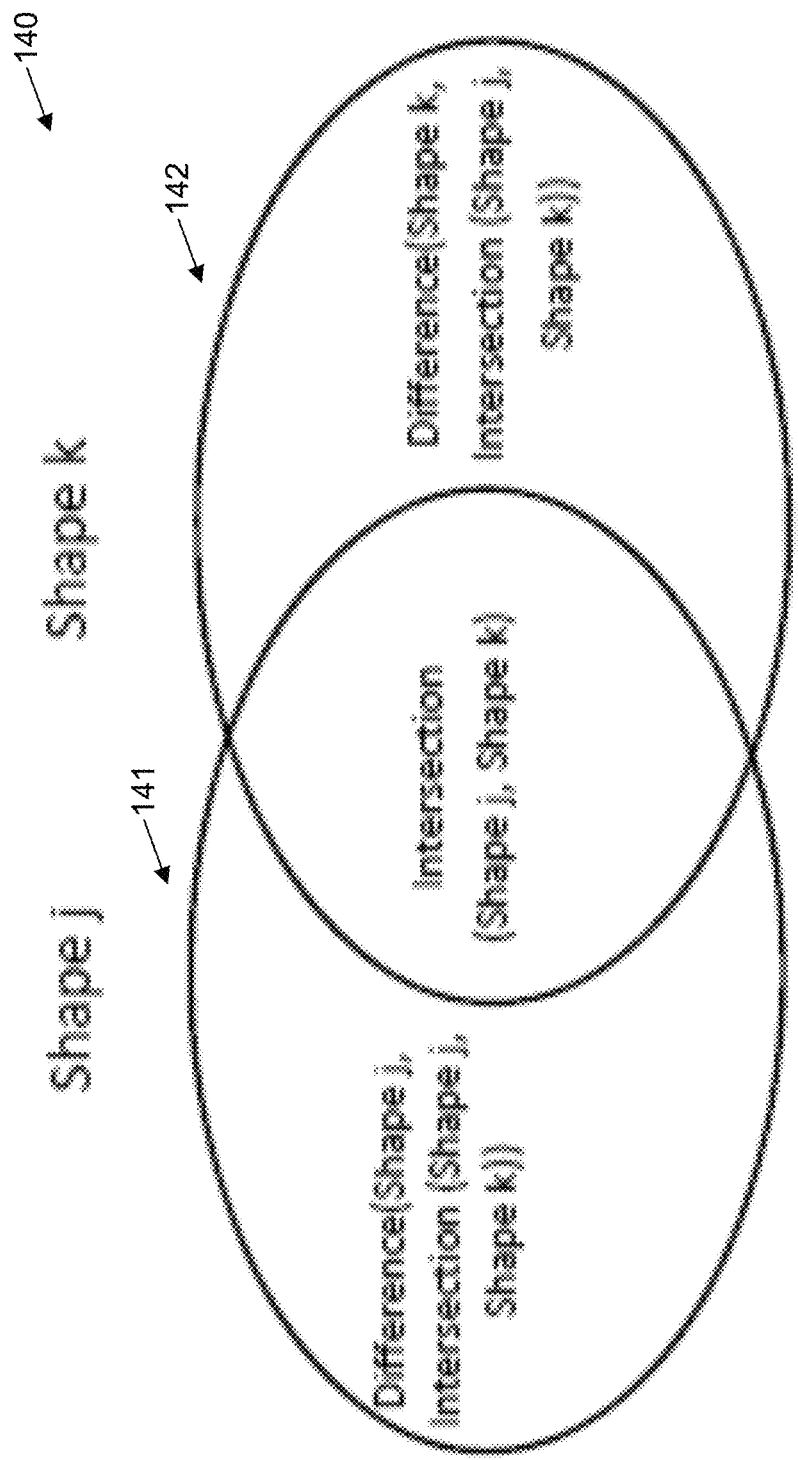
FIG. 14 illustrates schematically the intersection process of intersecting shapes.
Figure 15:
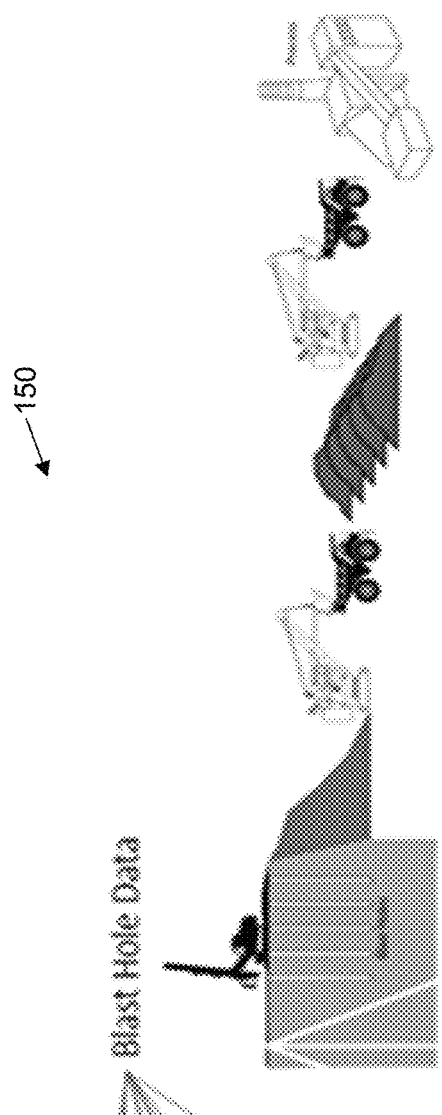
FIG. 15 illustrates schematically the process of adding blast hole data to a voxelNet.
Figure 15:
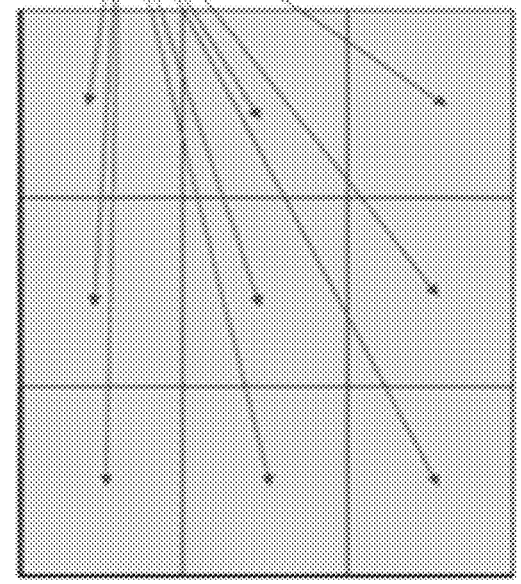
Figure 16:
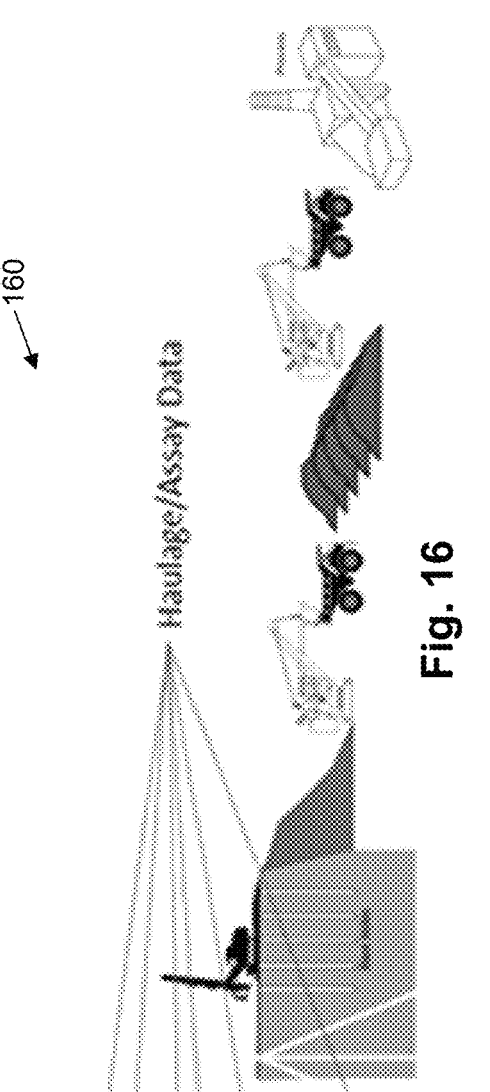
FIG. 16 illustrates schematically the process of adding haulage and assay data to a voxelNet.
Figure 16:
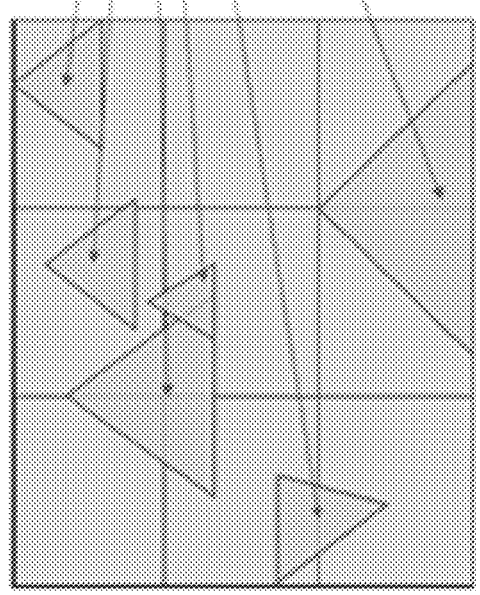
Figure 17:
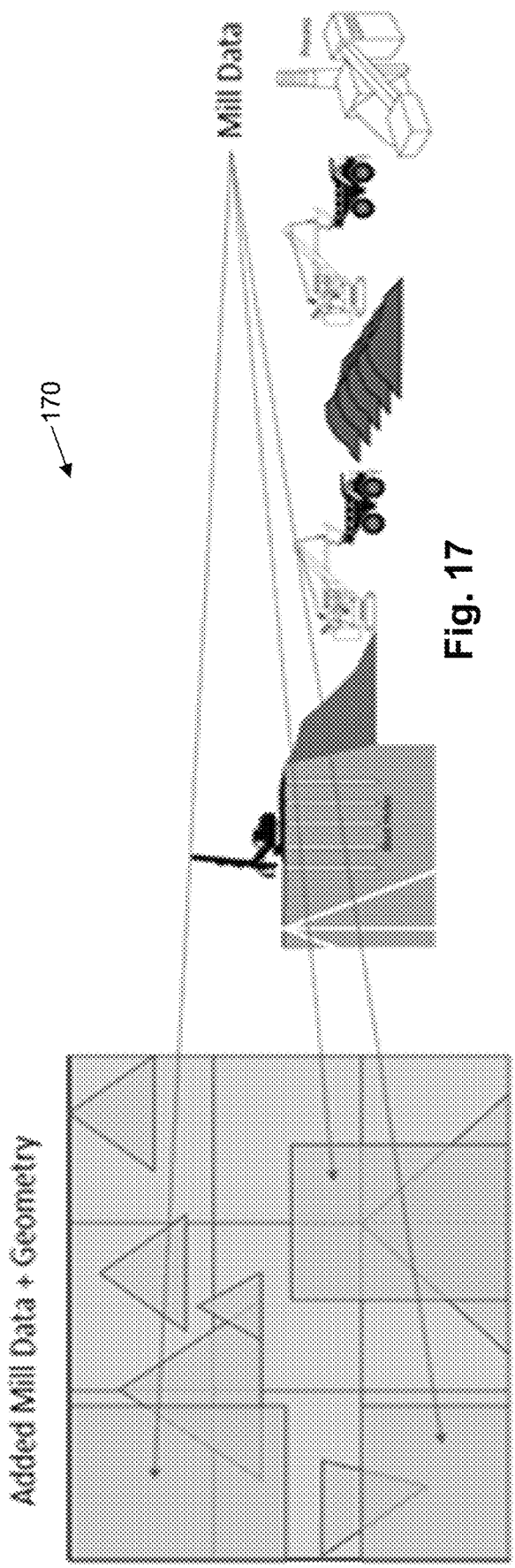
FIG. 17 illustrates adding Mill data to a model.
Figure 18:
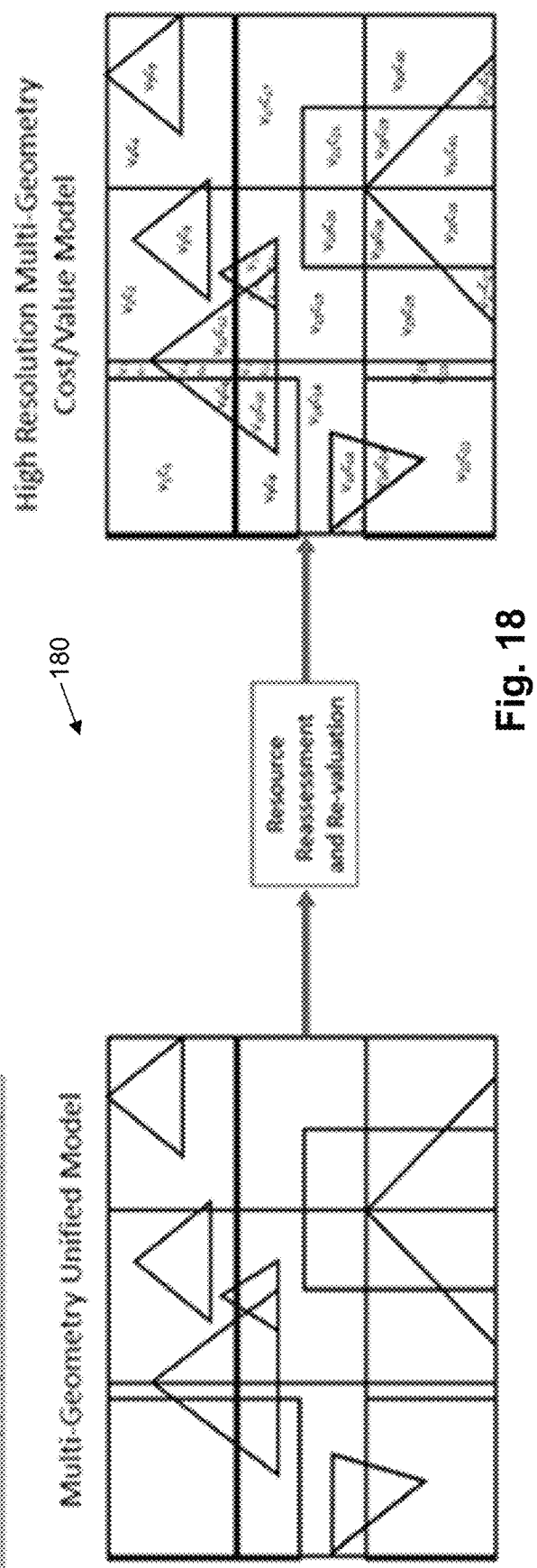
FIG. 18 illustrates the process of producing a high resolution model.
Figure 19:
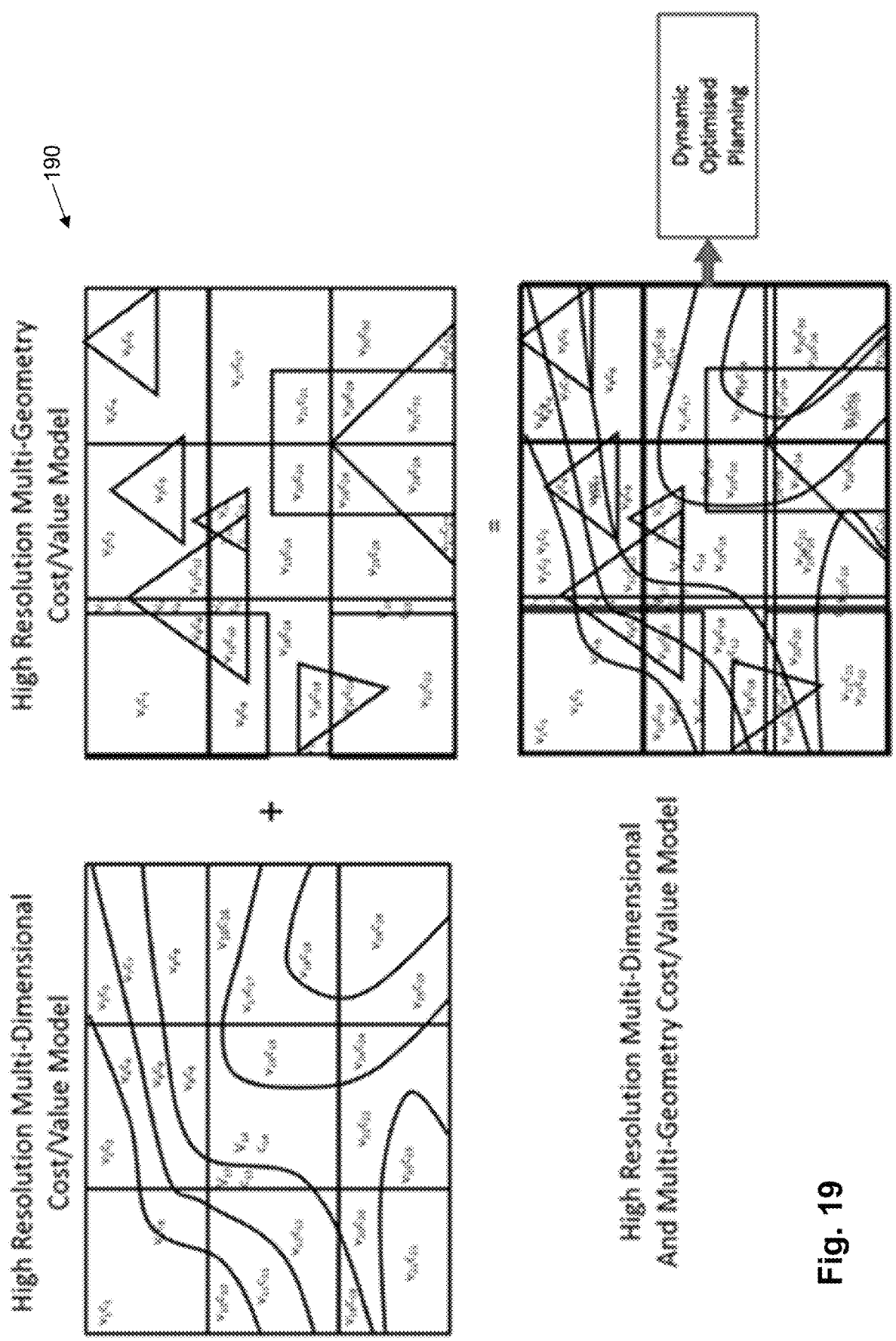
FIG. 19 illustrates the process of using a high resolution model in data planning.

The Intersect and Difference functions in step 5 above are illustrated 140 in FIG. 14, for two initial elliptical shapes j (141) and k (142).

The value function in step 6 can potentially be formulated in many ways, depending upon the analytical processes used in its formulation. A simple example is:

$$C_{voxel_x} = V \left( \sum_{i=1}^{Number\ of\ Descriptor\ Types} \sum_{j=1}^{Number\ of\ Descriptors\ of\ type\ i} W_i j \times Cf_{ij} \times D_{ij} \right) \quad (1)$$

Where: V is the volume of voxel x; C_(voxel_x) is the predicted cost of voxel x; W_i j terms are weight terms for the respective cost factor i of type j setting their overall influence on the cost of mining a voxel; this may start as a predicted value but can be derived from empirical analytics over time. W could default to 1 or be omitted if the cost factor alone is sufficient to represent costs. However, there may be other reasons for increasing or decreasing the cost of a descriptor other than representing its literal cost; an example of this might be to effectively exclude a block having high contaminant levels, such as Arsenic, when the processing circuit is unable to sufficiently eliminate the contaminant from the metal or concentrate product, given the overall geochemistry of feed into the mill; 〚Cf〛_ij terms are the cost factors i of type j representing the contribution to the predicted and/or actual costs of mining a unit of mass due to the descriptor type of the cost factor; D_ij is the value of a descriptor i of type j for the voxel x.

Equation (1) assumes that: i) all weights W_ij, cost factors 〚Cf〛_ij and descriptor values D_ij are independent, and ii) the cost contribution to a voxel of a specific attribute or descriptor of a voxel are a linear multiple of its weight W_i j, cost factors 〚Cf〛_ij and descriptor D_ij. Other value functions may be used for which the terms are not independent and/or the combination of terms is nonlinear. Value functions may also either be derived from planning and expected costs, or derived from empirical, historical data after the mine commences operation.

Dynamic Multi-Geometry Resource Voxelisation

A further issue is the inaccurate Representation of Process Cost/Values From Resource Block Parts that are Separated and/or Merged in Mining Operations Processes.

Application: Mineral Stockpiles and Blockchain Verification

The utilisation of the VoxelNET technology has other applications. For example, the ability to delineate voxels can allow for the pricing of mineral stockpiles. One application is to provide price forecast models so that buyers can purchase the right to purchase mineral stockpiles in the future when commodity prices have changed from current rates through financial based stockpile options. The financial transactions can be stored in a blockchain database for verification with geo-located and volumetric data to ensure contractual traceability for the exchange of derivatives. The underlying VoxelNET technology enables the cross correlation of site based data source to promote data-driven decision making by mining organisations.

Marginal-grade ore stockpiles are normally illiquid assets and require commodity prices to increase in order for the metal extraction process to be profitable. The ore stockpiles can be stored on mining sites as underutilized assets in the order of magnitude of thousands of tonnes.

Rather than waiting many years until commodity prices for the metals have enable a profitable metal extraction, the utilisation of the VoxelNet architecture allows derivative values of the mineral stockpile to be sold to willing buyers. The derivative would be in the form of a stockpile-commodity option, defined as the right to sell a time asset to the willing buyer in the future, given the asset is profitable in the future, agreed upon today for a future price. In doing so the solution transfers the time value and associated profit and risk to the willing buyer, using industry established pricing models. Mining companies are thereby able to free cash flow for greater current business operations. With the VoxelNET framework the information on the blockchain can be cross correlated with other site-based data loaded into VoxelNET to identify opportunities to optimize site based operations from market interest and multiple data sources from site.

With this VoxelNET application an option writer as a user can identify the geo-located ore stockpiles on site and derive a price forecast value for writing a time valued commodity option. The option trader as an app user would be able to trade units of stockpile derivatives. With the geo-locational stockpiles monitoring users would be able to more effectively quantify the mines life value and forecasted returns over extended timeframes. The overarching utility of this application to enable price forecasting of assets, given parameter inputs such as current market rates, volatility, the risk-free return rate etc. While the current use case is applied to marginal grade stockpiles, a user would be able to derive time associated values for other assets including in-situ mineral deposits. This is to be distinguished from current derivative exchanges which involve refining the ore before writing a derivative.

The use of the VoxelNET architecture allows for a difference in the asset and associated cost involved in the pricing process. For example, the cost for ore haulage and extraction process will be included in the pricing mechanism which has not been attempted with commodity derivatives before. Furthermore, the solution can be based on a blockchain with geo-located data to ensure material and locational traceability of value derived commodities. By leveraging VoxelNET's platform users would be able to cross correlate data on user interest through in the future extraction of commodities with other site based data sources, to assist with strategic decision making driven by market behaviours and interests.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A system for handling 3 dimensional spatial information geo-located within a geodetic reference frame expressed by latitude, longitude, and altitude, the system including:
a specialized application layer for the production of visual interactive applications associated with the 3 dimensional spatial information;
a generic foundation client providing 3 dimensional spatial information interrogation routines, including a message passing interface; and
a voxel server interconnected to said generic foundation client via said message passing interface for the storage of 3 dimensional spatial information as a voxel database,
wherein said voxel database structures said 3 dimensional spatial information in the form of a plurality of geo-referenced location voxels indexed by coordinates corresponding to latitude, longitude, and altitude in the geodetic reference frame.

2. A system as claimed in claim 1, wherein said voxel database stores said 3 dimensional information indexed by individual x, y and z co-ordinates geolocated within the geodetic reference frame, with x and y being planar co-ordinates corresponding to latitude and longitude, and z being depth co-ordinates corresponding to altitude.

3. A system as claimed in claim 2, wherein said voxel database recursively structures said 3 dimensional spatial information recursively, in a hierarchical manner.

4. A system as claimed in claim 1, wherein said 3 dimensional information is stored as either a geodetic space or Euclidian space which can be geolocated within the geodetic reference frame.

5. A system as claimed in claim 1, wherein the 3 dimensional spatial information includes material properties associated with said location information.

6. A system as claimed in claim 1, wherein the 3 dimensional spatial information includes data objects such as points, lines, planes, surfaces, polygons, shapes or volumes.

7. A system as claimed in claim 1, wherein the 3 dimensional spatial information includes structured data objects such as textures, images and video.

8. A system as claimed in claim 1, wherein said specialized application layer includes a real time object moving in a 3 dimensional spatialized space, recording spatialized data.

9. A system as claimed in claim 1, wherein said 3 dimensional spatial information includes mineral resource value estimates associated with said 3 dimensional spatial location.

10. A system as claimed in claim 9, wherein said mineral resource value estimates are derived from the merging of multiple models associated with the 3 dimensional spatial information.

11. A system as claimed in claim 1, wherein said 3 dimensional spatial information includes blockchain verifiable data.

12. A method for storage, access and updating of geographically or geodetically based data geo-located within a geodetic reference frame expressed by latitude, longitude, and altitude, the method including the steps of:
storing the data in the form of a plurality of geo-referenced location voxels indexed by individual x,y and z coordinates, with x and y indicating planar coordinates corresponding to latitude and longitude in the geodetic reference frame, and z indicating depth coordinates corresponding to altitude in the geodetic reference frame.

13. A method as claimed in claim 12, further comprising storing the data indexed by temporal coordinates.

14. A method as claimed in claim 12, wherein said geographically or geodetically based data is stored in a recursively subdividable 3D volumetric manner with geo-referenced spatial location data.

15. A method as claimed in claim 12, further comprising forming material voxels having volume elements spatially quantizing volumes of material.

16. A method as claimed in claim 15, wherein said material voxels are hierarchically composable and decomposable.

17. A method as claimed in claim 12, wherein said x and y coordinates represent approximately 1 m distances with scalability.

18. A method as claimed in claim 12, wherein said z coordinates range from a default height of about 20 km to a depth of about 5 km.

19. A method as claimed in claim 12, wherein said voxels include data objects including points, lines and planes (which can be textures, images and video).

20. A method as claimed in claim 12, wherein said voxels include volume data bounded by a spatial boundary.

21. A method as claimed in claim 12, wherein said voxels include temporal time series elements.

22. A method as claimed in claim 12, wherein said voxels include structures defining a probabilistic distribution of material within a voxel.

23. A method as claimed in claim 12, further including a voxel editor for editing voxels.

* * * * *